(12) United States Patent
Patel et al.

(10) Patent No.: US 12,219,256 B1
(45) Date of Patent: Feb. 4, 2025

(54) VARIABLE FLEXURE ARM SIZES FOR FLEXURE MODULE OF CAMERA WITH MOVEABLE IMAGE SENSOR

(71) Applicant: Apple Inc., Cupertino, CA (US)

(72) Inventors: Himesh Patel, Fremont, CA (US); Qiang Yang, Fremont, CA (US); Peng Chen, Fremont, CA (US)

(73) Assignee: Apple Inc., Cupertino, CA (US)

( * ) Notice: Subject to any disclaimer, the term of this patent is extended or adjusted under 35 U.S.C. 154(b) by 301 days.

(21) Appl. No.: 17/934,563

(22) Filed: Sep. 22, 2022

(51) Int. Cl.
*H04N 23/68* (2023.01)
*H04N 23/54* (2023.01)

(52) U.S. Cl.
CPC .......... *H04N 23/687* (2023.01); *H04N 23/54* (2023.01)

(58) Field of Classification Search
None
See application file for complete search history.

(56) References Cited

U.S. PATENT DOCUMENTS

| | | | |
|---|---|---|---|
| 10,582,128 B2* | 3/2020 | Wei | H04N 23/57 |
| 10,781,800 B2* | 9/2020 | Brown | F03G 7/065 |
| 11,792,516 B1* | 10/2023 | Patel | H04N 23/54 |
| | | | 348/294 |
| 11,962,881 B1* | 4/2024 | Patel | H04N 23/687 |
| 12,088,897 B1* | 9/2024 | Patel | H04N 23/57 |
| 2016/0241785 A1* | 8/2016 | Chiouchang | H04N 23/6812 |
| 2020/0036898 A1* | 1/2020 | Kuo | G03B 5/00 |
| 2021/0080807 A1* | 3/2021 | Sharma | G03B 3/10 |
| 2022/0091397 A1* | 3/2022 | Brodie | G02B 13/0065 |
| 2023/0056192 A1* | 2/2023 | Patel | H04N 23/55 |
| 2024/0107144 A1* | 3/2024 | Miller | H04N 23/55 |
| 2024/0107167 A1* | 3/2024 | Mahmoudzadeh | H04N 23/57 |

FOREIGN PATENT DOCUMENTS

CN 215420435 U * 1/2022 ............ H04N 5/225

* cited by examiner

*Primary Examiner* — Cynthia Segura
(74) *Attorney, Agent, or Firm* — Robert C. Kowert; Kowert, Hood, Munyon, Rankin & Goetzel, P.C.

(57) ABSTRACT

A flexure for a camera module is provided. The flexure includes a dynamic platform to which an image sensor is connected such that the image sensor moves with the dynamic platform. The flexure also includes a static platform connected to a static portion of the camera. The flexure further includes a plurality of flexure arms that mechanically connect the dynamic platform to the static platform. The plurality of flexure arms includes a first flexure arm including one or more signal traces having a first impedance and a base layer having a first width. The plurality of flexure arms includes a second flexure arm including one or more signal traces having a second impedance and a base layer having a second width. The first impedance is greater than the second impedance. The first width is less than the second width. The second flexure arm routes image data from the image sensor.

20 Claims, 14 Drawing Sheets

VARIABLE FLEXURE ARM SIZES FOR FLEXURE MODULE OF CAMERA WITH MOVEABLE IMAGE SENSOR

BACKGROUND

Technical Field

This disclosure relates generally to variable flexure arms sizes for flexure modules of a camera with a moveable image sensor.

Description of the Related Art

The advent of small, mobile multipurpose devices such as smartphones and tablet or pad devices has resulted in a need for high-resolution, small form factor cameras for integration in the devices. Some cameras may incorporate optical image stabilization (OIS) mechanisms that may sense and react to external excitation/disturbance by adjusting location of the optical lens on the X and/or Y axis in an attempt to compensate for unwanted motion of the lens. Furthermore, some cameras may incorporate an autofocus (AF) mechanism whereby the object focal distance can be adjusted to focus an object plane in front of the camera at an image plane to be captured by the image sensor. In some such AF mechanisms, the optical lens is moved as a single rigid body along the optical axis of the camera to refocus the camera.

BRIEF DESCRIPTION OF THE DRAWINGS

FIG. 1 shows an overhead view of the exterior of the camera. FIG. 2A shows a cross-sectional view of the camera across the A-A plane. FIG. 2B shows a cross-sectional view of the camera across the B-B plane.

Figure 1:
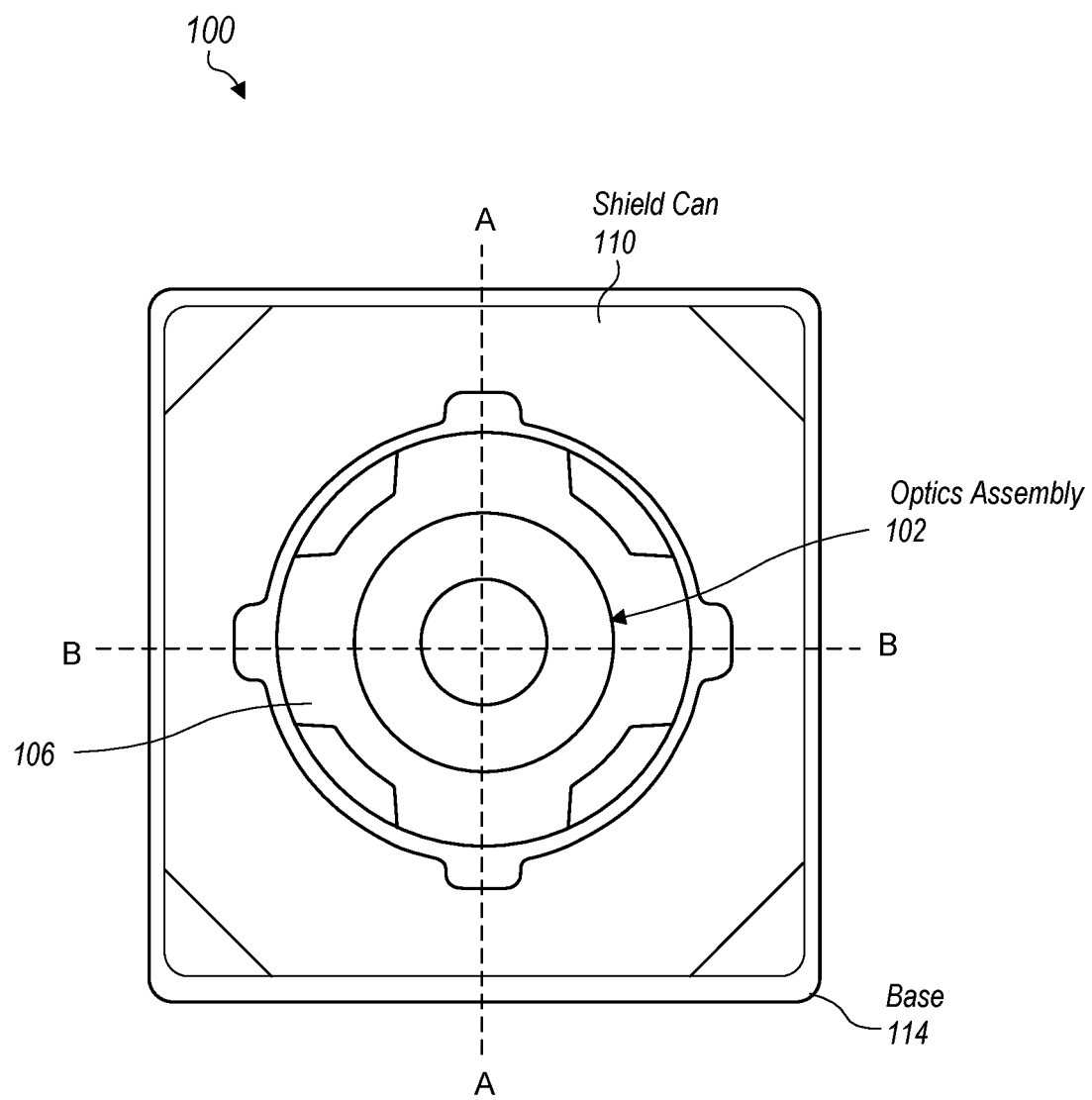
FIGS. 1, 2A, and 2B illustrate components of an example camera having an actuator module or assembly that may, for example, be used to provide autofocus through optics assembly movement and/or optical image stabilization through image sensor movement in small form factor cameras, according to at least some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

Various embodiments described herein relate to a flexure module that may be used in a camera with a moveable image sensor. In some examples, the camera may include camera equipment outfitted with controls, magnets, and voice coil motors to improve the effectiveness of a miniature actuation mechanism for a compact camera module. More specifically, in some embodiments, compact camera modules include actuators to deliver functions such as autofocus (AF) and optical image stabilization (OIS). One approach to delivering a very compact actuator for OIS is to use a Voice Coil Motor (VCM) arrangement.

In some embodiments, sensor shift designs may utilize a flexure based component for communicating power and electronic signals between electronic components (e.g., an image sensor, drivers, voltage regulators, and the like) coupled to a dynamic platform and a remainder of a camera system. For example, to support either 8K30FPS and 4K120 video modes, higher data rates per flexure arm and/or electrical traces of the flexure may provide support while maintaining a same quantity of flexure arms and/or electrical traces of the flexure. As these electronic components increase in capability, the available bandwidth and signal integrity across the flexure may be increased to support the increased capability. To improve signal integrity and increase a data rate, an impedance on the flexure and a tolerance on the flexure may be reduced. For example, a cross-sectional area of one or more electrical traces through a flexure arm may be increased to lower impedance and reduce tolerances of the flexure. As another example, a width of one or more flexure arms of the flexure may be increased to lower impedance and reduce tolerances on the flexure. As another example, a distance between electrical traces on a flexure arm may be increased to reduce cross talk between the electrical traces. As another example, a width of one or more flexure arms of the flexure may be increased to lower impedance and reduce tolerances on the flexure. However, an increase in flexure arm width and/or an increase in electrical trace cross-sectional size may increases a stiffness of the flexure arms and the flexure. As described further herein, modifying (e.g., increasing) a width of one or more flexure arms of a set of flexure arms of the flexure and/or modifying (e.g., increasing) a cross-sectional area of electrical trace(s) through a flexure arm and associating those one or more flexure arms with a high-speed data link (HS-DL) while maintaining a stiffness of the set of flexure arms to be substantially similar to a stiffness of a second set of flexure arms at an opposite corner of the flexure may improve signal integrity and increase a bandwidth across the flexure. The concepts described herein may provide new flexure designs with lower impedance variation, enhanced insertion/return loss, improved process variation (e.g., with increased width/spacing), and tapered channel design for flattening impedance.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

Figure 2A:
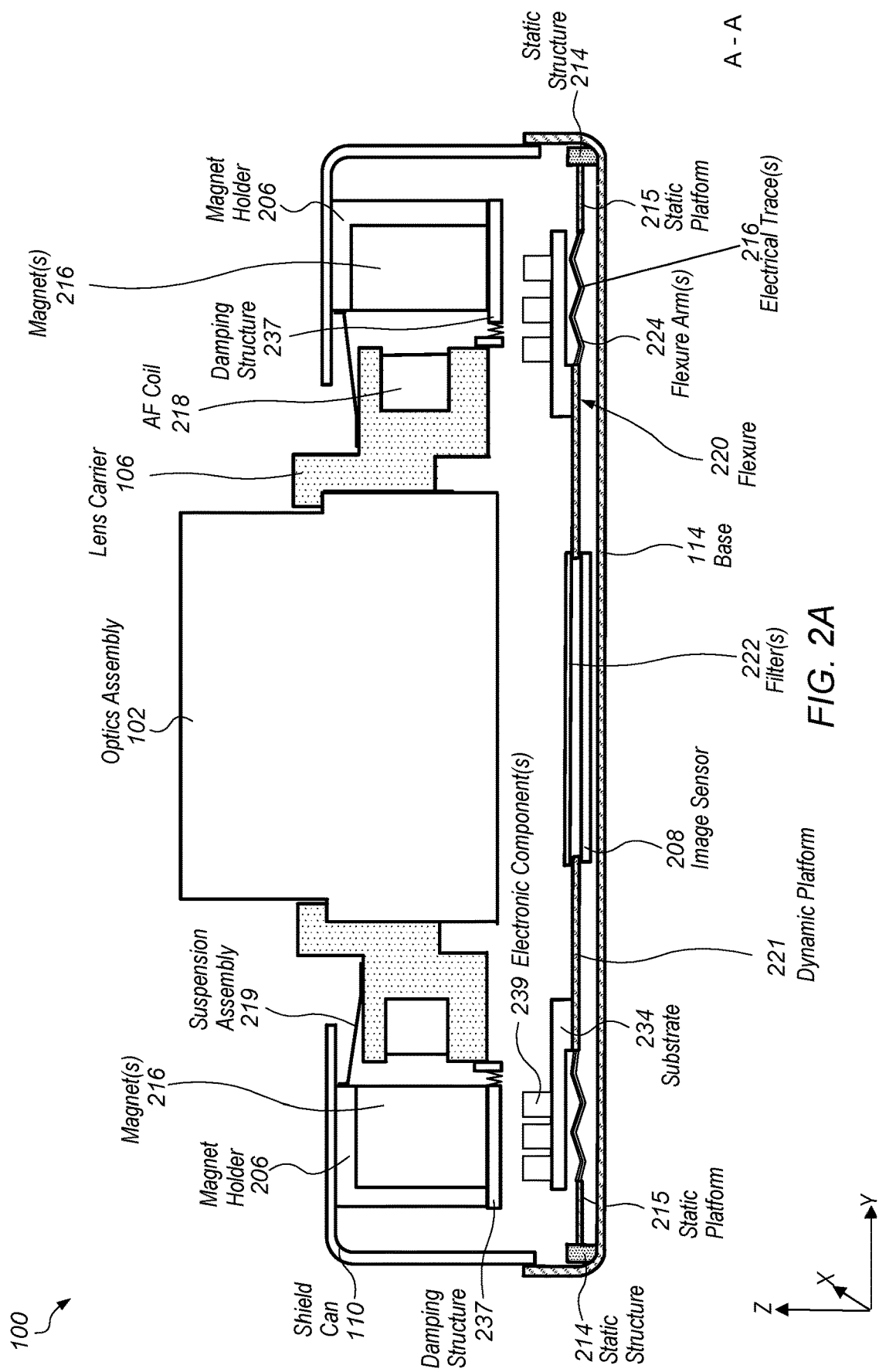
Figure 2B:
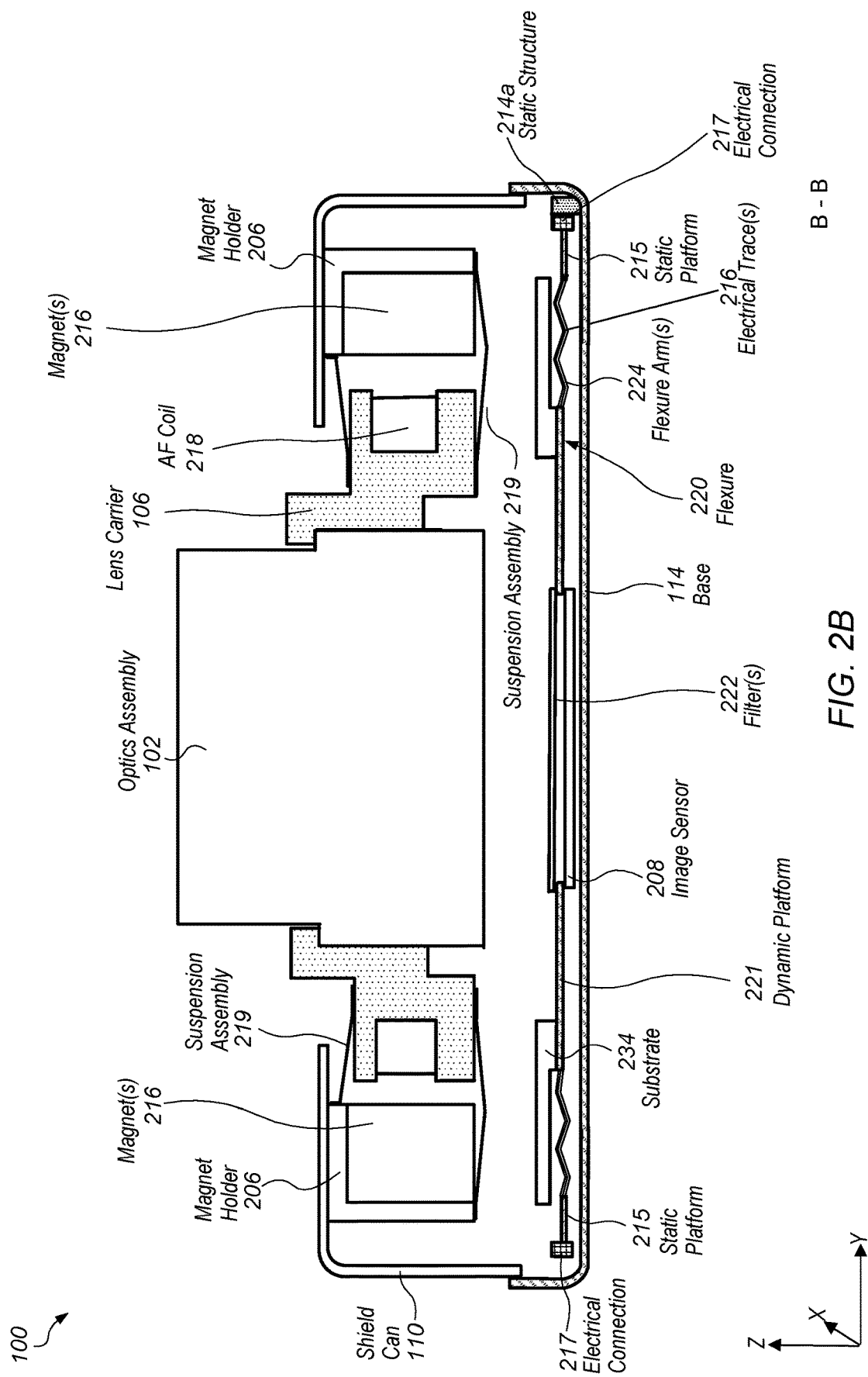

FIGS. 1, 2A, and 2B illustrate components of an example camera 100 having an actuator module or assembly that may, for example, be used to provide autofocus through optics assembly movement and/or optical image stabilization through image sensor movement in small form factor cameras, according to at least some embodiments. FIG. 1 shows an overhead view of the exterior of the camera 100. FIG. 2A shows a cross-sectional view of the camera 100 across the A-A plane. FIG. 2B shows a cross-sectional view of the camera 100 across the B-B plane. The camera module 100 may include one or more same or similar features as the features described with respect to or illustrated in FIGS. 3, 4, 5, 6A, 6B, 7, 8, 9, 10, 11, 12, and 13. The example X-Y-Z coordinate system shown in FIGS. 1, 2A, and 2B is used to discuss aspects of components and/or systems, and may apply to embodiments described throughout this disclosure.

In various embodiments, the camera 100 may include an optics assembly 102 having one or more lenses, a shield can 110, a magnet holder 206, magnet(s) 216, a lens carrier 106, an AF coil 218, a base 114, one or more OIS coils (e.g., OIS coils 622 illustrated in FIG. 6), a substrate 234 (e.g., an OIS FPC, printed circuit board, and/or the like), an image sensor 208, and an OIS frame or flexure 220. In some embodiments, the OIS frame or flexure 220 may be connected to a bottom surface of the base 114. In some examples, the base 114 may define one or more recesses and/or openings having multiple different cross-sections. For instance, a lower portion of the base 114 and/or an upper portion of the base 114 may define a recess and/or an opening with a cross-section sized to receive the OIS frame or flexure 220.

The shield can 110 may be mechanically attached to the base 114. The camera 100 may include an axial motion (AF) voice coil motor (VCM) (e.g., axial motion VCM) and/or a transverse motion (OIS) VCM. In some cases, the axial motion VCM may include the optics assembly 102, the magnet holder 206, the magnet 216, the lens carrier 106, and/or the AF coil 218. Furthermore, the transverse motion VCM may include the OIS coils (e.g., OIS coils 622 illustrated in FIG. 6), the substrate 234, the image sensor 208, the OIS frame or flexure 220 including the dynamic platform 221, the static platform 215, and the plurality of flexure arms 224 described herein. In some examples, the axial motion VCM (or a portion thereof) may be connected to the shield can 110, while the transverse motion VCM (or a portion thereof) may be connected to the base 114.

The flexure 220 may include a dynamic platform 221, a static platform 215, and a plurality of flexure arms 224. The plurality of flexure arms 224 may provide a flexible mechanical coupling between the static platform 215 and the dynamic platform 221 and allowing the dynamic platform 221 to move (e.g., using an OIS VCM) (e.g., in the x-y directions) relative to the static platform 215 (e.g., a remainder of the camera 100). In some aspects, the flexure arms 224 may include electrical traces 216 for communicating electrical power and electrical signals between the dynamic platform 221 (e.g., one or more electronic components (e.g., electronic components 239) mounted on the substrate 234, the image sensor 208 mounted on the substrate 234, one or more electronic components mounted to the dynamic platform 221, or the like) and the static platform 215. The electronic components may be for actuation of the dynamic platform 221 of the flexure relative to the static platform 215 of the flexure 220. As shown in FIG. 2A, the static platform 215 may be attached to the static structure 214 which is stationary with the camera 100. As shown in FIG. 2B, the static platform 215 may include electrical connections 217 for facilitating electrical communication between flexure platform 220 and one or more other electrical components of the camera 100 for performing one or more camera operations. In some aspects, the static platform 215 may be in electrical communication with one or more other components of the camera 110, via the electrical connection 217 and the static structure 214a have one or more electrical pathways between the electrical connection 217 and one or more other components of the camera 100, for performing one or more camera operations.

In some non-limiting examples, the image sensor 208 may be attached to or otherwise integrated into the substrate 234, such that the image sensor 208 is connected to the OIS frame or flexure 220 via the substrate 234. For example, the dynamic platform 221 may retain the substrate 234 for mounting one or more electronic components 239 and/or the image sensor 208. The substrate 234 may include an opening with a cross-section sized to permit light to pass therethrough while also receiving or retaining the filter(s) 222 and the image sensor 208. An upper surface of a top layer of the substrate 234 may retain the filter(s) 222 around a perimeter of the opening and a lower surface of a lower layer of the substrate 234 may retain the image sensor 208 around the perimeter of the opening. In some aspects, a ceramic layer beneath the lower layer of the substrate 234 may couple the image sensor 208 to the substrate 234. In some aspects, the lower layer of the substrate 234 may include a ceramic material that may couple the image sensor 208 to the substrate 234. With the lower surface of the lower layer of the substrate 234 retaining the image sensor 208 around the perimeter of the opening, the image sensor 208 may be connected (e.g., mechanically and/or electrically) to the flexure 220 via the substrate 234. This configuration may allow the substrate 234 to retain the image sensor 208 (and the filter(s) 222) while also allowing light to pass from the lens(es) of the optics assembly 102, through the filter(s) 222, and be received by the image sensor 208 for image capturing. In other embodiments, the substrate 234 and the image sensor 208 may be separately attached to the OIS frame or flexure 220. For instance, a first set of one or more electrical traces 216 may be routed between the substrate 234 and the OIS frame or flexure 220. A second, different set of one or more electrical traces 216 may be routed between the image sensor 208 and the OIS frame or flexure 220. In some aspects, an AF coil may be integrated or embedded within the substrate 234.

In addition, the camera 100 may also include an AF damping structure 237 (e.g., attached to the AF coil carrier, inner surface of the shield can 101), a suspension assembly 219, and one or more electronic components 239. The AF damping structure 237 may providing damping of movement of the optics assembly 102 in the z-direction. The suspension assembly 219 may retain the optics assembly 102 within a z-range of motion relative to the shield can 110. The electronic components 239 may be positioned on the substrate 234 and may include low voltage drop-outs (LDOs), voltage regulators (e.g., capacitors), positions sensors, drivers, and/or the like. In some aspects, the electronic components 239 (e.g., voltage regulators) may provide a power supply for the image sensor 208 and other drivers (e.g., driver circuits).

Figure 3:
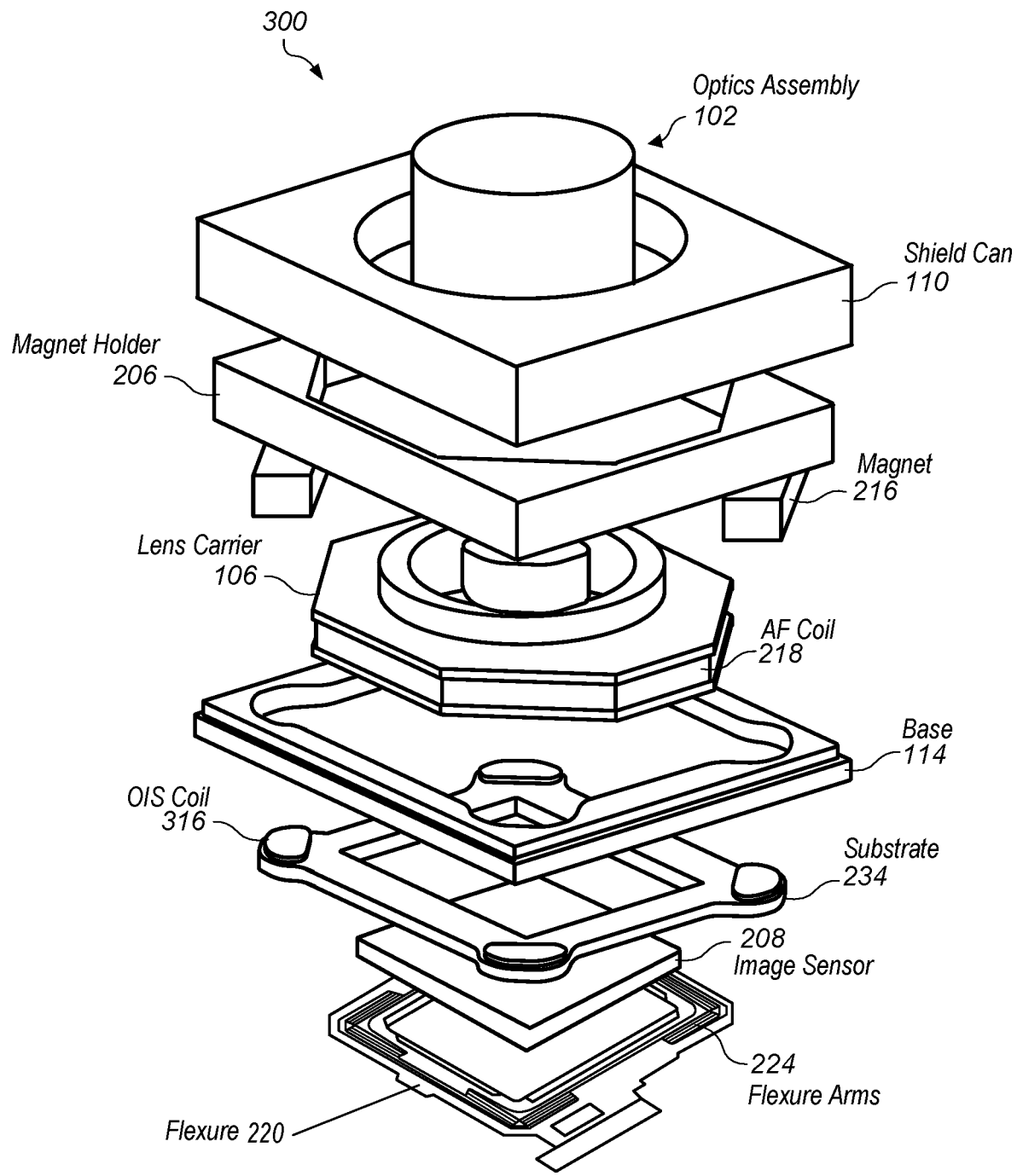
FIG. 3 shows an exploded view of an example camera having an actuator module or assembly that may, for example, be used to provide autofocus through optics assembly movement and/or optical image stabilization through image sensor movement in small form factor cameras, according to at least some embodiments.

FIG. 3 shows an exploded view of an example camera 300 having an actuator module or assembly that may, for example, be used to provide autofocus through optics assembly movement and/or optical image stabilization through image sensor movement in small form factor cameras, according to at least some embodiments. The camera 300 may include one or more same or similar features as the features described with respect to or illustrated in FIGS. 1, 2A, 2B, 4, 5, 6A, 6B, 7, 8, 9, 10, 11, 12, and 13. In various embodiments, the camera 300 may include one or more same or similar features as the camera 100 illustrated in FIGS. 1, 2A, and 2B. As shown in FIG. 3, the camera 300 may include the optics assembly 102, the shield can 110, the magnet holder 206, the magnet 216, the lens carrier 106, the AF coil 218, the base 114, an OIS coil 316, the substrate 234, the image sensor 208, the flexure 220 (e.g., in accordance with one or more embodiments of the flexure modules described herein with reference to FIGS. 4, 5, 6A, 6B, 7, 8, 9, 10, and/or 11), and/or the flexure arms 224.

In various examples, the shield can 110 may be mechanically attached to the base 114. The camera 300 may include an axial motion (AF) voice coil motor (VCM) and/or a transverse motion (OIS) VCM. In some cases, the axial motion VCM may include the optics assembly 102, the magnet holder 206, the magnet 216, the lens carrier 106, and/or the AF coil 218. Furthermore, the transverse motion VCM may include the OIS coil 316, the substrate 234, the image sensor 208, the flexure 220, and/or the flexure arms 224. In some examples, the axial motion VCM (or a portion thereof) may be connected to the shield can 110, while the transverse motion VCM (or a portion thereof) may be connected to the base 114.

In some embodiments, the substrate 234 and/or the flexure 220 may be connected to a bottom surface of the base 114. In some examples, the base 114 may define one or more recesses and/or openings having multiple different cross-sections. For instance, a lower portion of the base 114 may have may define a recess and/or an opening with a cross-section sized to receive the flexure 220. An upper portion of the base 114 may define a recess and/or an opening with a cross-section sized to receive the substrate 234. The upper portion may have an inner profile corresponding to the outer profile of the substrate 234. This may help to maximize the amount of material included in the base 114 (e.g., for providing structural rigidity to the base 114) while still providing at least a minimum spacing between the substrate 234 and the base 114.

In some non-limiting examples, the substrate 234 and the image sensor 208 may be separately attached to the flexure 220. For instance, a first set of one or more electrical traces 216 may be routed between the substrate 234 and the flexure 220. A second, different set of one or more electrical traces 216 may be routed between the image sensor 208 and the flexure 220. In other embodiments, the image sensor 208 may be attached to or otherwise integrated into the substrate 234, such that the image sensor 208 is connected to the flexure 220 via the substrate 234, e.g., as discussed below with reference to FIG. 4.

Figure 4:
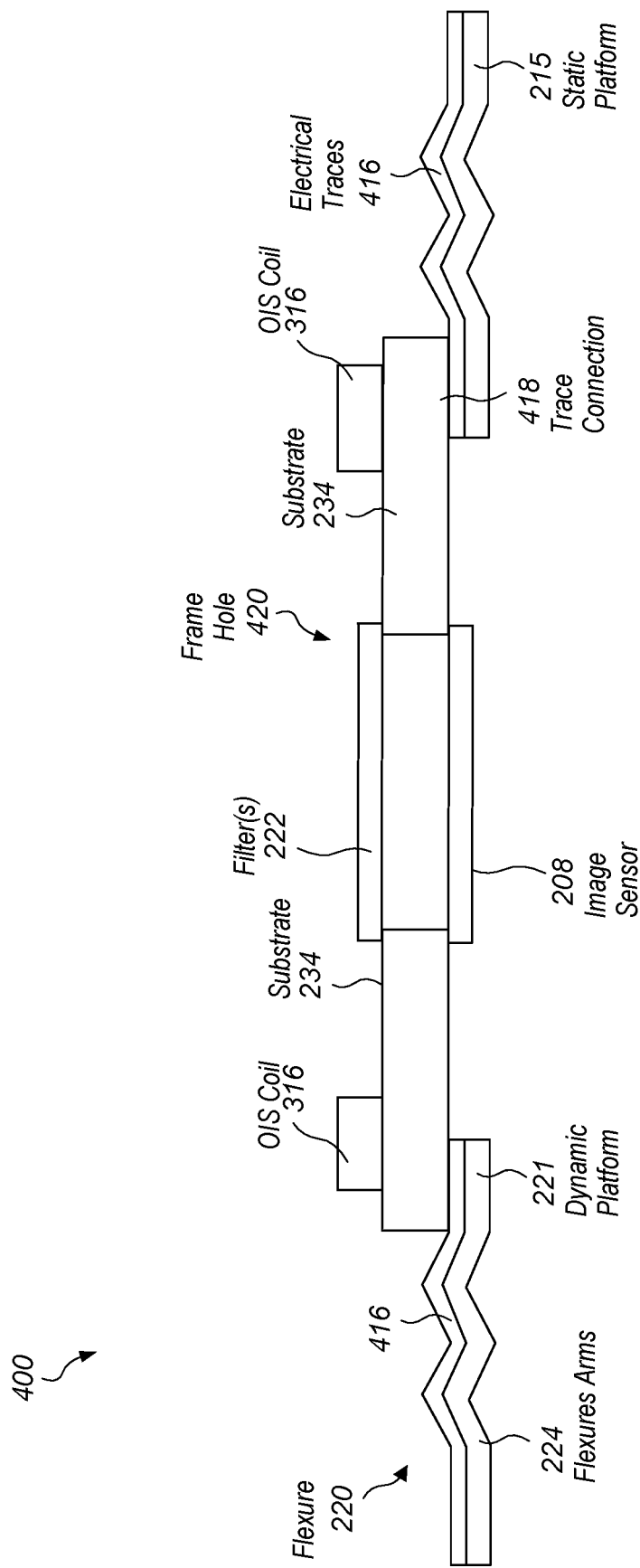
FIG. 4 illustrates a cross-sectional view of an example transverse motion voice coil motor (VCM) that may be used, for example, in a camera to provide optical image stabilization, in accordance with some embodiments.

FIG. 4 illustrates a cross-sectional view of an example transverse motion voice coil motor (VCM) 400 that may be used, for example, in a camera to provide optical image stabilization (OIS), in accordance with some embodiments. The VCM 400 may be included with and/or include one or more same or similar features as the features described with respect to or illustrated in FIGS. 1, 2A, 2B, 3, 5, 6A, 6B, 7, 8, 9, 10, 11, 12, and 13. In some embodiments, the transverse motion VCM 400 may include the flexure 220, the image sensor 208, substrate 234, and/or an OIS coil 316. The flexure 220 may include the dynamic platform 221, a static platform 215, and one or more flexure arms 224. The flexure arms 224 may connect the dynamic platform 221 to the static platform 215. In some examples, one or more of the flexure arms 224 may include one or more electrical traces 416 routed between the static platform 215 and the dynamic platform 221 and/or the substrate 234.

In some embodiments, the image sensor 208 may be attached to or otherwise integrated into the substrate 234 such that the image sensor 208 is connected to the flexure 220 via the substrate 234. In some examples, there may be one or more trace connections 418 between the substrate 234 and the flexure 220. In some cases, the flexure 220 may have a hole 420 extending therethrough, and filter(s) 222 and the image sensor 208 may be placed over openings of the hole 420. This may allow for a reduction in z height (e.g., the height of the transverse motion VCM 400 along an optical axis of the camera) in some cases.

In some examples, the substrate 234 may extend from the dynamic platform 221 such that a portion of the substrate 234 is positioned over the flexure arms 224 (e.g., in a plane above the flexure arms 224). In some examples, at least a portion of each of the OIS coils 316 to be positioned above the flexure arms 224. Such an arrangement may facilitate miniaturization of the transverse motion VCM 400 and/or the camera, as the dynamic platform 221 need not be sized to accommodate both the image sensor 208 and the OIS coils 316.

Figure 5:
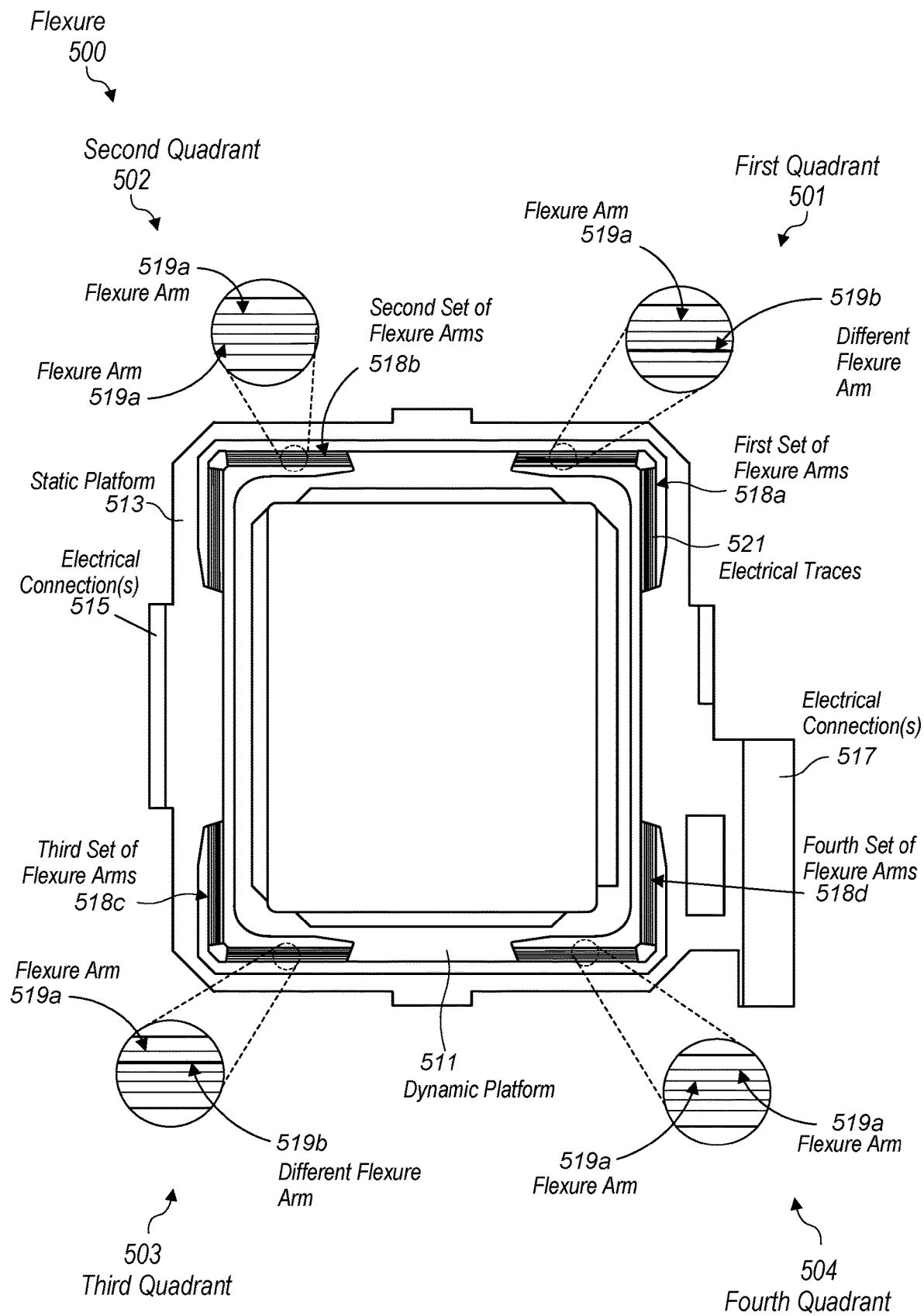
FIG. 5 illustrates an overhead view of an example flexure, in accordance with some embodiments.

FIG. 5 illustrates an overhead view of an example flexure 500, according to at least some embodiments. The flexure 500 may be combined with and/or include one or more same or similar features as the features described with respect to or illustrated in FIGS. 1, 2A, 2B, 3, 4, 6A, 6B, 7, 8, 9, 10, 11, 12, and 13. As shown in FIG. 5, the flexure 500 includes a dynamic platform 511, a static platform 513, a first set of electrical connections 515, a second set of electrical connections 517, a first set of flexure arms 518a, a second set of flexure arms 518b, a third set of flexure arms 518c, a fourth set of flexure arms 518d, flexure arms 519a, different flexure arms 519b, and electrical traces 521 for each flexure arm for each of the sets of flexure arms. The dynamic platform 511 may include one or more same or similar features as the dynamic platform 221 illustrated in FIG. 4. The static platform 513 may include one or more same or similar features as the static platform 215 illustrated in FIG. 4. The flexure arms 519a and the different flexure arms 519b may include one or more same or similar features as the flexure arms 224 illustrated in FIG. 4. The electrical traces 521 may include one or more same or similar features as the electrical traces 416 illustrated in FIG. 4. For example, the electrical traces 521 may be used to provide electronic communication between the static platform 513 and the dynamic platform 511. The first set of electrical connections 515 and/or the second set of electrical connections 517 may be used to connect the flexure 500 (e.g., and an image sensor in electronic communication with the flexure 500, and one or more electronic components in electronic communication with the flexure 500) with one or more other electronic systems of a camera.

The flexure 500 may include four quadrants including a first quadrant 501, a second quadrant 502, a third quadrant 503, and a fourth quadrant 504. Each of the quadrants may include a set of flexure arms having electrical traces. For example, the first quadrant 501 may include the first set of flexure arms 519a, the second quadrant 502 may include the second set of flexure arms 519b, the third quadrant 503 may include the third set of flexure arms 519c, and the fourth quadrant 504 may include the fourth set of flexure arms 519d. As described further herein, the sets of flexure arms of respective quadrants may include at least one flexure arm 519a. The flexure arms 519a may have a same or similar (e.g., common) attributes (e.g., a same or similar base width, a same or similar electrical trace width, a same or similar electrical trace distance spacing, a same or similar insulation layer thickness, a same or similar quantity of electrical traces, a same or similar material forming an electrical trace, a same or similar insulation layer material, and/or the like). In some aspects, the flexure arms 519a may have a same flexure arm type. As described herein, the flexure arms 519a may have a higher impedance compared to different flexure arms 519b and/or other different flexure arms 519c.

In some aspects, the sets of flexure arms in the respective quadrants may have a respective impedance and stiffness due to the attributes of the individual flexure arms. For example, as shown in FIG. 5, because the second set of flexure arms 518b and the fourth set of flexure arms 518d (e.g., diagonal the flexure 500 from each other) include only the flexure arms 519a while also having respective same or similar lengths, the second set of flexure arms 518b may have a same or similar impedances and stiffnesses compared to the fourth set of flexure arms 518d. Thus, in some instances, the first set of flexure arms 518a and the third set of flexure arms 519b (e.g., diagonal the flexure 500 from each other) may also include only the flexure arms 519a while also having respective same or similar lengths. Like the second set of flexure arm 519b and the fourth set of flexure arm 519d, the first set of flexure arms 518a may have a same or similar impedances and stiffnesses compared to the third set of flexure arms 518c. In this case, the sets of flexure arms in each of the respective quadrants may have a same or similar relative impedance and stiffness. Having a same or similar relative impedance and stiffness between the sets of flexure arms in each of the respective quadrants may provide a level of function of the OIS VCM and/or the AF VCM, as described herein.

In some aspects, the flexure 500 may include one or more different flexure arms (e.g., that are different from the flexure arms 519a, that are different than one or more other flexure arms). For example, the first set of flexure arms 518a may include at least one different flexure arm 519b. The different flexure arms 519*b* may be a different flexure arm type compared to the flexure arm 519*a*. In some aspects, the different flexure arm 519*b* may have a different impedance (e.g., a lesser impedance) and/or a different stiffness (e.g., a greater stiffness) compared to the flexure arm 519*a*. For example, to achieve a different impedance, the different flexure arm 519*b* may have at least one different attribute compared to the flexure arm 519*a*. For instance, the different flexure arm 519*b* may include a different base width, a different electrical trace width, a different electrical trace distance spacing, a different insulation layer thickness, a different quantity of electrical traces, a different material forming an electrical trace, a different insulation layer material, and/or the like compared to the flexure arm 519*a*. As another example, to achieve a lower impedance, the different flexure arm 519*b* may include at least one of a greater base width, a greater electrical trace width, a greater electrical trace distance spacing (e.g., to reduce cross talk), and/or the like compared to the flexure arm 519*a*. In some aspects, due to a difference between one or more attributes of the flexure arm 519*a* and the different flexure arm 519*b*, the different flexure arm 519*b* may have a different stiffness (e.g., per unit length) compared to a stiffness of the flexure arm 519*a*. For instance, the different flexure arm 519*b* may include a base thickness that is greater than a base thickness of the flexure arms 519*a*, an electrical trace width or cross-section that is greater than an electrical trace width or cross-section of the flexure arms 519*a*, and/or the like. Thus, the different flexure arm 519*b* may have a lesser impedance an/or a greater stiffness compared to an impedance and/or a stiffness of the flexure arm 519*a*. In some aspects, the different flexure arm(s) 519*b* may be used to route image data from an image sensor. In some aspects, the flexure arm(s) 519*a* may be used route other data between the static platform and the dynamic platform.

In some aspects, due to a difference between one or more attributes of the different flexure arms 519*b* and one or more attributes of the flexure arms 519*a* creating the difference in impedance, the different flexure arms 519*b* may have a different stiffness (e.g., per unit length) compared to a stiffness of the flexure arms 519*a*. For instance, the different flexure arms 519*b* may include a base thickness that is greater than a base thickness of the flexure arm 519*a*. Thus, the different flexure arms 519*b* may have a greater stiffness compared to a stiffness of the flexure arms 519*a*. As shown in FIG. 5, the set of flexure arms in the first quadrant may include at least one different flexure arm 519*b*. The different flexure arm 519*b* in the first quadrant 501 may provide a high-speed data link (HS-DL) for electronic communication between the dynamic platform 511 and the static platform 513. The different flexure arm 519*b* of the first set of flexure arms 518*a* may include one or more attributes that provide a greater stiffness compared to the stiffness of the flexure arms 519*a*. Thus, because the first set of flexure arms 518*a* include a different flexure arm 519*b*, the first set of flexure arms 518*a* may have a greater stiffness compared to the second set of flexure arms 518*b* and the fourth set of flexure arms 518*d*. However, to maintain a level of function of the OIS VCM and/or the AF VCM, as described herein, the first set of flexure arms 518*a* may have a same or similar stiffness as the third set of flexure arms 518*c*.

In some aspects, one or more flexure arms 519*a* may be removed from the flexure 500 so that the first set of flexure arms 518*a* includes a same or similar stiffness compared to the stiffness of the third set of flexure arms 518*c*. For instance, the first set of flexure arms 518*a* may include the different flexure arm 519*b* and a lesser total quantity of flexure arms compared to the third set of flexure arms 518*c* (e.g., when having only flexure arms 519*a*). Thus, the first set of flexure arms 518*a* with the different flexure arm 519*b* but with lesser total flexure arms compared to the third set of flexure arms 518*c* may have a same or similar stiffness as the third set of flexure arms 518*c* (e.g., having only flexure arms 519*a*).

In some aspects, one or more different flexure arms 519*b* may replace one or more flexure arms 519*a* of the flexure 500 so that the first set of flexure arms 518*a* includes a same or similar stiffness compared to the stiffness of the third set of flexure arms 518*c*. For instance, the first set of flexure arms 518*a* may include flexure arms 519*a* and a different flexure arm 519*b* having a stiffness that is greater than a stiffness of the flexure arms 519*a*. Thus, when the third set of flexure arms 518*c* includes only the flexure arms 519*a*, the first set of flexure arms 518*a* have a greater combined stiffness compared to the third set of flexure arms 518*c*. However, when the third set of flexure arms 518*c* also include flexure arms 519*a* and a different flexure arm 519*b* so that both the first set of flexure arms 518*a* and the third set of flexure arms 518*c* have the same quantity of flexure arms 519*a* and different flexure arms 519*b*, the first set of flexure arms 518*a* may have a same as or at least similar stiffness compared to the third set of flexure arms 518*c*.

As shown in FIG. 5, the third set of flexure arms 518*c* may include at least one different flexure arm 519*b* (e.g., replacing a flexure arm 519*a*). Thus, the combined stiffness of the first set of flexure arms 518*a* (e.g., having one different flexure arm 519*b*) may be the same as or at least similar to the combined stiffness of the third set of flexure arms 518*c* (e.g., also having one different flexure arm 519*b*). With this configuration, the first set of flexure arms 518*a* and the third set of flexure arms 518*c* may have a same or similar stiffness while also having a different stiffness from the second set of flexure arms 518*b* and the further set of flexure arms 518*d*. With the first set of flexure arms 518*a* and the third set of flexure arms 518*d* having the same or similar stiffness, a HS-DL through the different flexure arms 519*b* in both sets of flexure arms may be provided while also maintaining a level of function of the OIS VCM and/or the AF VCM.

Figure 6A:
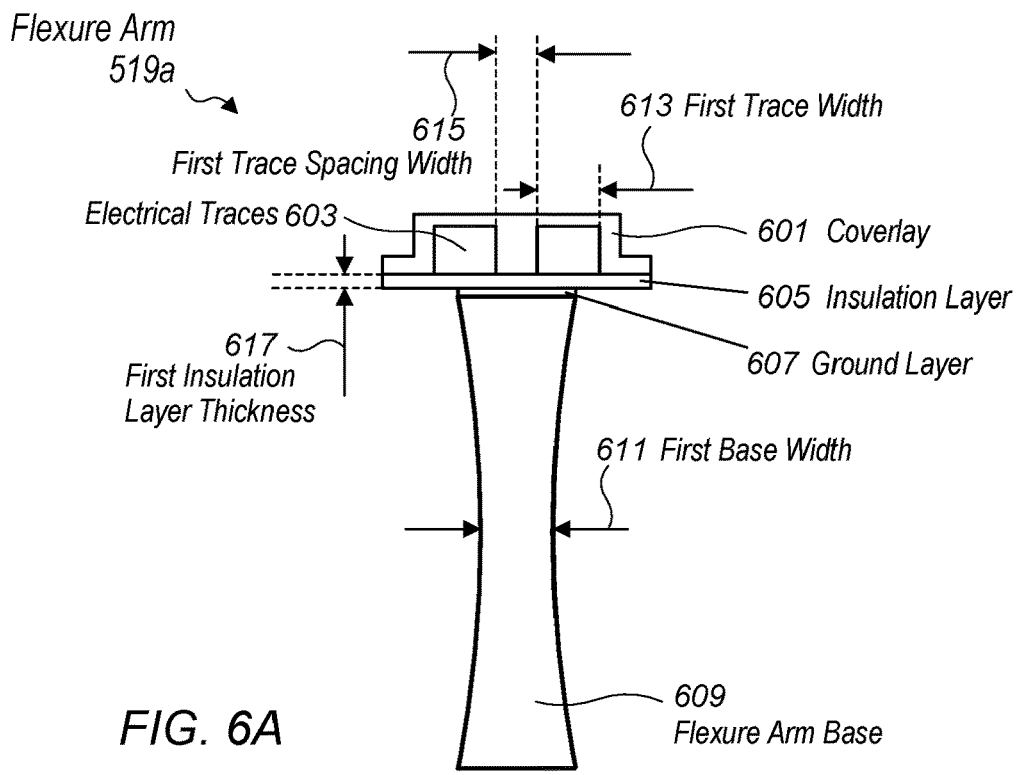
FIG. 6A illustrates a cross-sectional view of example flexure arm, in accordance with some embodiments.

FIG. 6A illustrates a cross-sectional view of example flexure arm 519*a*, in accordance with some embodiments. The flexure arm 519*a* may be combined with and/or include one or more same or similar features as the features described with respect to or illustrated in FIGS. 1, 2A, 2B, 3, 4, 5, 6B, 7, 8, 9, 10, 11, 12, and 13. As shown in FIG. 6A, the flexure arm 519*a* may include a coverlay 601, one or more electrical traces 603, an insulation layer 605, a ground layer 607, and a flexure arm base 609. The one or more electrical traces 603 and/or the ground layer 607 may include plated copper and the insulation layer 605 may include a polyimide material. In some aspects, the flexure arm 519*a* may include the one or more electrical traces 603 each having a first trace width 613. The flexure arm 519*a* may have a first trace spacing width 615 indicating a distance between the electrical traces 603. Further, the flexure arm base 609 may include a first base width 611. In some aspects, the insulation layer 605 may include a first insulation layer thickness 617.

Figure 6B:
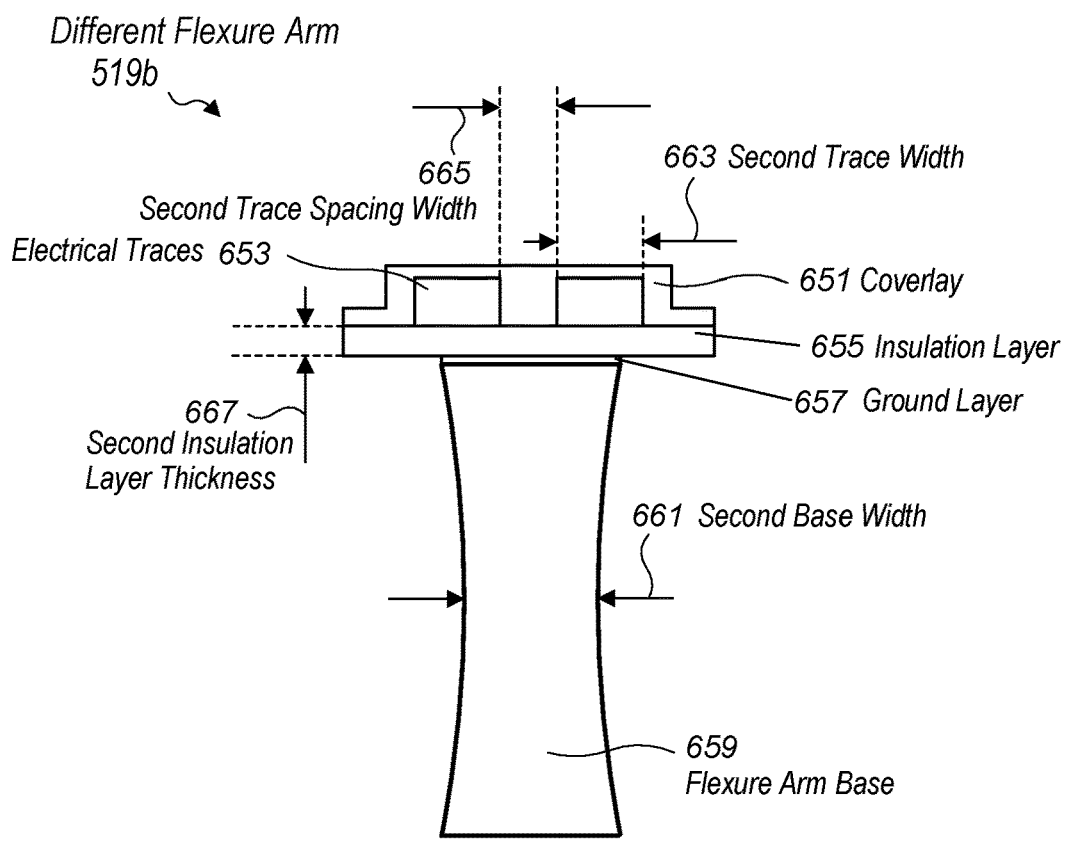
FIG. 6B illustrates a cross-sectional view of example different flexure arm, in accordance with some embodiments.

FIG. 6B illustrates a cross-sectional view of example different flexure arm, in accordance with some embodiments. The flexure arm 519*a* may be combined with and/or include one or more same or similar features as the features described with respect to or illustrated in FIGS. 1, 2A, 2B, 3, 4, 5, 6A, 7, 8, 9, 10, 11, 12, and 13. As shown in FIG. 6B, the flexure arm 519*b* may include a coverlay 651, one or more electrical traces 653, an insulation layer 655, a ground layer 657, and a flexure arm base 659. The one or more electrical traces 653 and/or the ground layer 657 may include plated copper and the insulation layer 655 may include a polyimide material. In some aspects, the flexure arm 519b may include the one or more electrical traces 653 each having a second trace width 663. The second trace width 663 may be different from (e.g., greater than) the first trace width 613. The flexure arm 519b may have a second trace spacing width 665 indicating a distance between the electrical traces 653. The second trace spacing width 665 may be different from (e.g., greater than) the first trace spacing width 615. Further, the flexure arm base 659 may include a second base width 661. The second base width 661 may be different from (e.g., greater than) the first base width 611. In some aspects, the insulation layer 655 may include a second insulation layer thickness 667. The second insulation layer thickness 667 may be different from (e.g., greater than) the first insulation layer thickness 617. Implementing one or more different flexure arms 519b (e.g., in place of one or more flexure arms 519a of a flexure) with a different (e.g., increased) base width, a different electrical trace width, a different electrical trace spacing width, a different insulation layer thickness and/or other different attributes (e.g., compared to the flexure arms 519a), as described herein, may provide lower impedance variation, enhanced insertion/return loss, improved process variation, and tapered channel design for flattening impedance for the flexure. As described herein, the different flexure arms 519b may associated with a HS-DL and provide the flexure with improved signal integrity and increased bandwidth.

Figure 7:
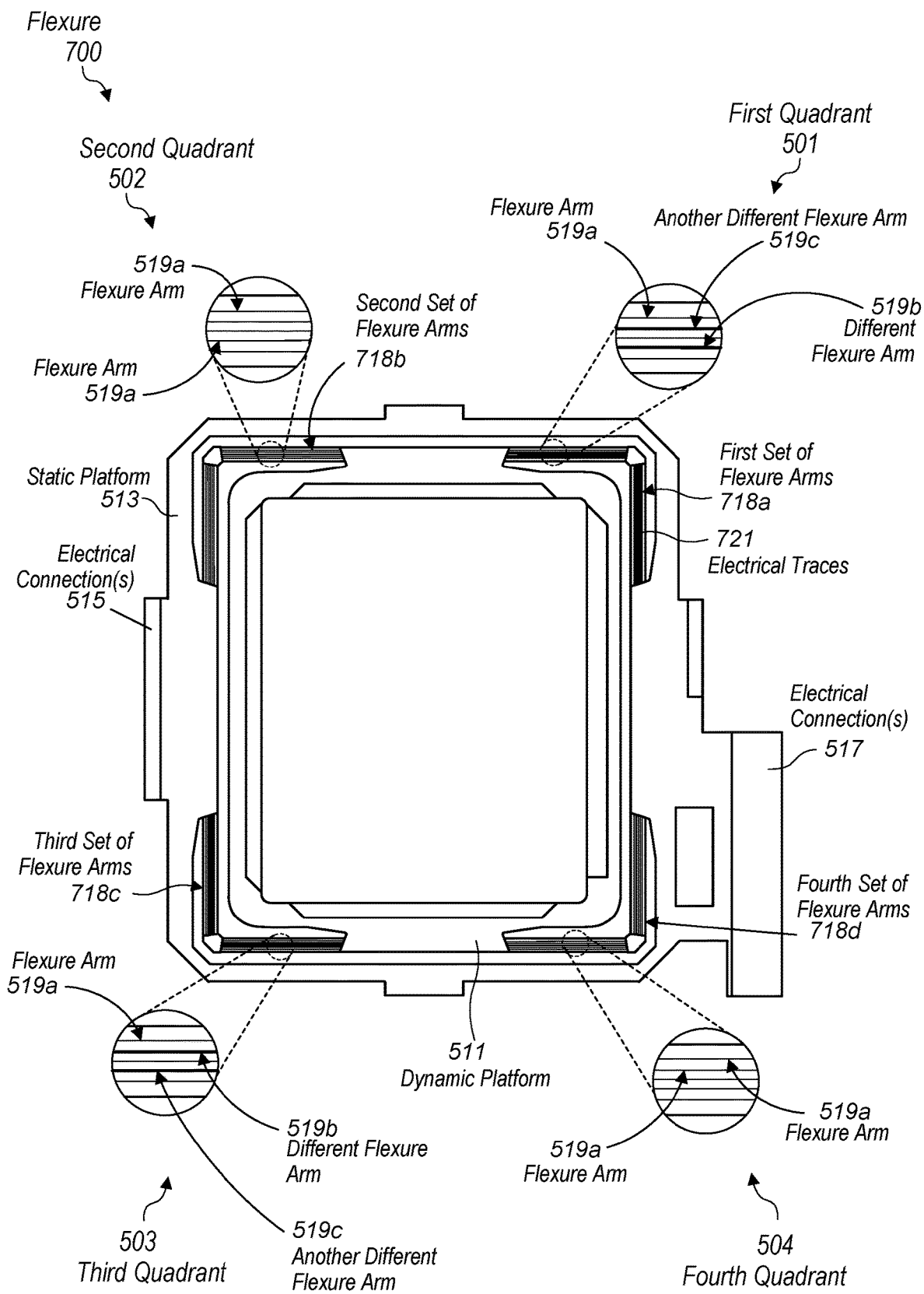
FIG. 7 illustrates an overhead view of an example flexure, in accordance with some embodiments.

FIG. 7 illustrates an overhead view of an example flexure, in accordance with some embodiments. The flexure 700 may be combined with and/or include one or more same or similar features as the features described with respect to or illustrated in FIGS. 1, 2A, 2B, 3, 4, 5, 6A, 6B, 8, 9, 10, 11, 12, and 13. As shown in FIG. 7, the flexure 700 includes the dynamic platform 511, the static platform 513, the first set of electrical connections 515, the second set of electrical connections 517, a first set of flexure arms 718a, a second set of flexure arms 718b, a third set of flexure arms 718c, a fourth set of flexure arms 718d, the flexure arms 519a, the different flexure arms 519b, other different flexure arms 519c, and electrical traces 721 for each flexure arm of each of the sets of flexure arms. The dynamic platform 511 may include one or more same or similar features as the dynamic platform 221 illustrated in FIG. 4. The static platform 513 may include one or more same or similar features as the static platform 215 illustrated in FIG. 4. The flexure arms 519a, the different flexure arms 519b, and the other different flexure arms 519c may include one or more same or similar features as the flexure arms 224 illustrated in FIG. 4. The electrical traces 721 may include one or more same or similar features as the electrical traces 416 illustrated in FIG. 4. For example, the electrical traces 721 may be used to provide electronic communication between the static platform 513 and the dynamic platform 511. The first set of electrical connections 515 and/or the second set of electrical connections 517 may be used to connect the flexure 700 (e.g., and an image sensor in electronic communication with the flexure 700, and one or more electronic components in electronic communication with the flexure 700) with one or more other electronic systems of a camera.

The flexure 700 may include four quadrants including the first quadrant 501, the second quadrant 502, the third quadrant 503, and the fourth quadrant 504. Each of the quadrants may include a set of flexure arms having electrical traces. For example, the first quadrant 501 may include a first set of flexure arms 718a, the second quadrant 502 may include a second set of flexure arms 718b, the third quadrant 503 may include a third set of flexure arms 718c, and the fourth quadrant 504 may include a fourth set of flexure arms 718d. As described further herein, the sets of flexure arms of respective quadrants may include at least one flexure arm 519a. The flexure arms 519a may have a same or similar (e.g., common) attributes (e.g., a same or similar base width, a same or similar electrical trace width, a same or similar electrical trace distance spacing, a same or similar insulation layer thickness, a same or similar quantity of electrical traces, a same or similar material forming an electrical trace, a same or similar insulation layer material, and/or the like). In some aspects, the flexure arms 519a may have a same flexure arm type. As described herein, the flexure arms 519a may have at least one different attributed compared to different flexure arms 519b and compared to other different flexure arms 519c.

In some aspects, the sets of flexure arms in the respective quadrants may have a respective stiffnesses due to the attributes of the individual flexure arms. For example, as shown in FIG. 7, because the second set of flexure arms 718b and the fourth set of flexure arms 718d (e.g., diagonal the flexure 700 from each other) include only the flexure arms 519a while also having respective same or similar lengths, the second set of flexure arms 718b may have a same or similar stiffness compared to the fourth set of flexure arms 718d. Thus, in some instances, the first set of flexure arms 718a and the third set of flexure arms 718d (e.g., diagonal the flexure 700 from each other) may also include only the flexure arms 519a while also having respective same or similar lengths. Like the second set of flexure arms 718b and the fourth set of flexure arms 718d, the first set of flexure arms 718a may have a same or similar stiffness compared to the third set of flexure arms 718c. In this case, the sets of flexure arms in each of the respective quadrants may have a same or similar relative stiffness. Having a same or similar relative stiffness between the sets of flexure arms in each of the respective quadrants may provide a level of function of the OIS VCM and/or the AF VCM, as described herein.

In some aspects, the flexure 700 may include one or more different flexure arms 519b (e.g., that are different from the flexure arms 519a) and one or more other different flexure arms 519c (e.g., that are different from the flexure arms 519a and the different flexure arms 519b). For example, the first set of flexure arms 718a may include at least one different flexure arm 519b and at least one other different flexure arm 519c. The different flexure arm 519b may be a different flexure arm type compared to the other different flexure arm 519c. In some aspects, the different flexure arm 519b may have a different impedance (e.g., a lesser impedance) and/or a different stiffness (e.g., a greater stiffness) compared to the other different flexure arm 519c. For example, to achieve a different impedance, the different flexure arm 519b may have at least one different attribute compared to the other different flexure arm 519c. For instance, the different flexure arm 519b may include a different base width, a different electrical trace width, a different electrical trace distance spacing, a different insulation layer thickness, a different quantity of electrical traces, a different material forming an electrical trace, a different insulation layer material, and/or the like compared to the other different flexure arm 519c. As another example, to achieve a lower impedance, the different flexure arms 519b may include at least one of a greater base width, a greater electrical trace width, a greater electrical trace distance spacing (e.g., to reduce cross talk), and/or the like compared to the other different flexure arm 519c. In some aspects, due to a difference between one or more attributes of the different flexure arm 519b and the other different flexure arms 519c, the different flexure arm 519b may have a different stiffness (e.g., per unit length) compared to a stiffness of the other different flexure arm 519c. For instance, the different flexure arm 519b may include a base thickness that is greater than a base thickness of the other different flexure arm 519c, an electrical trace width or cross-section that is greater than an electrical trace width or cross-section of the other different flexure arm 519c, and/or the like. Thus, the different flexure arm 519b may have a lesser impedance an/or a greater stiffness compared to an impedance and/or a stiffness of the other different flexure arm 519c. In some aspects, the different flexure arm(s) 519b and/or the other different flexure arm(s) 519c may be used to route image data from an image sensor. In some aspects, the flexure arm(s) 519a may be used route other data between the static platform and the dynamic platform.

In some aspects, due to a difference between one or more attributes of the flexure arms 519a, the different flexure arms 519b, the other different flexure arms 519c, the different flexure arms 519b may have a different stiffness (e.g., per unit length) compared to a stiffness of the flexure arms 519a and the other different flexure arms 519c may have a different stiffness (e.g., per unit length) compared to a stiffness of the flexure arms 519a and the different flexure arm 519b. For instance, the different flexure arms 519b may include a base thickness that is greater than a base thickness of the flexure arm 519a. Thus, the different flexure arms 519b may have a greater stiffness compared to a stiffness of the flexure arms 519a. Also, the other different flexure arm 519c may include a base thickness that is greater than a base thickness of the flexure arm 519a and less than a base thickness of the different flexure arm 519b. Thus, the different flexure arms 519b may have a greater stiffness compared to a stiffness of the flexure arms 519a and the other different flexure arms 519c may have a greater stiffness compared to a stiffness of the flexure arms 519a and a lesser stiffness compared to the stiffness of the different flexure arm 519b. As shown in FIG. 7, the first set of flexure arms 718a may include a different flexure arm 519b and another different flexure arm 519c. The different flexure arm 519b and the other different flexure arm 519c in the first set of flexure arms 718a may provide HS-DLs for electronic communication between the dynamic platform 511 and the static platform 513. The different flexure arm 519b and the other different flexure arm 519c of the first set of flexure arms 718a may include one or more attributes that provide a greater stiffness compared to the stiffness of the flexure arms 519a. Thus, because the first set of flexure arms 718a includes the different flexure arm 519b and the other different flexure arm 519c, the first set of flexure arms 718a may have a greater stiffness compared to the second set of flexure arms 718b and the fourth set of flexure arms 718d. However, to maintain a level of function of the OIS VCM and/or the AF VCM, as described herein, the first set of flexure arms 718a may have a same or similar stiffness as the third set of flexure arms 718c.

In some aspects, one or more flexure arms 519a may be removed from the flexure 700 so that the first set of flexure arms 718a includes a same or similar stiffness compared to the stiffness of the third set of flexure arms 718c. For instance, the first set of flexure arms 718a may include the different flexure arm 519b and the other different flexure arm 519c and a lesser total quantity of flexure arms compared to the third set of flexure arms 718c (e.g., having only flexure arms 519a). Thus, the first set of flexure arms 718a may have a same or similar stiffness as the third set of flexure arms 718c.

In some aspects, one or more different flexure arms 519b and one or more other different flexure arms 519c may replace one or more flexure arms 519a of the flexure 700 so that the first set of flexure arms 718a may include a same or similar stiffness compared to the stiffness of the third set of flexure arms 718c. For instance, the first set of flexure arms 718a may include flexure arms 519a, the different flexure arm 519b, and the other different flexure arm 519c. Thus, when the third set of flexure arms 718c include only the flexure arms 519a, the first set of flexure arms 718a may have a greater combined stiffness compared to the third set of flexure arms 718c. However, as shown in FIG. 7, the third set of flexure arms 718c includes the flexure arms 519a, the different flexure arm 519b, and the other different flexure arm 519c so that both the first set of flexure arms 718a and the third set of flexure arms 718c have the same quantity of flexure arms 519a, different flexure arms 519b, and other different flexure arms 519c. With this configuration, the first set of flexure arms 718a and the third set of flexure arms 718c may have a same or similar stiffness (e.g., a combined stiffness) while also having a different stiffness (e.g., different combined stiffnesses) from the second set of flexure arms 718b and the fourth set of flexure arms 718d. With the first set of flexure arms 718a and the third set of flexure arms 718c having the same or similar stiffness, a HS-DL through the different flexure arms 519b in both the first set of flexure arms 718a and the third set of flexure arms 718c may be provided while also maintaining a level of function of the OIS VCM and/or the AF VCM.

Figure 8:
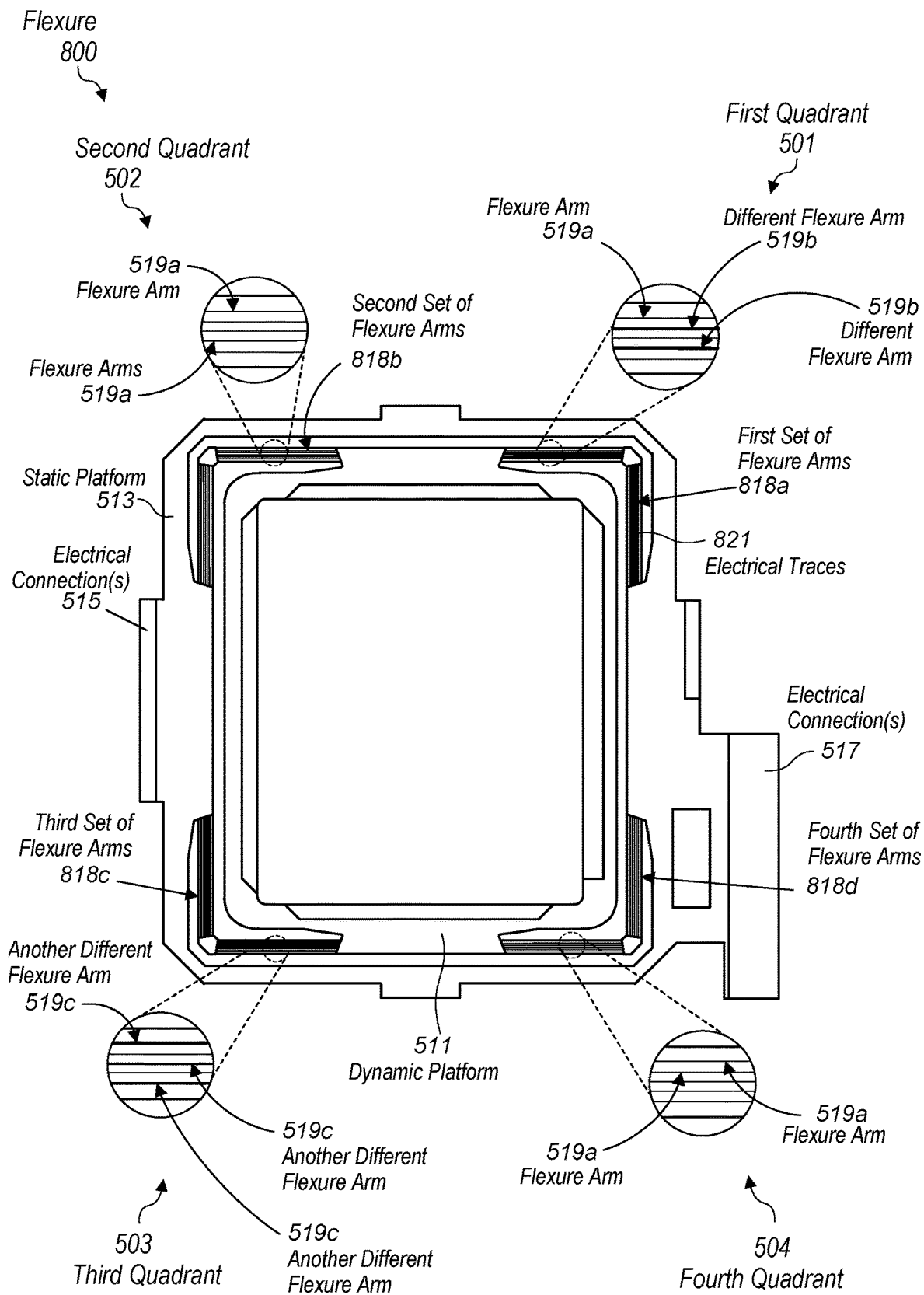
FIG. 8 illustrates an overhead view of an example flexure, in accordance with some embodiments.

FIG. 8 illustrates an overhead view of an example flexure 800, in accordance with some embodiments. The flexure 800 may be combined with and/or include one or more same or similar features as the features described with respect to or illustrated in FIGS. 1, 2A, 2B, 3, 4, 5, 6A, 6B, 7, 9, 10, 11, 12, and 13. As shown in FIG. 8, the flexure 800 includes the dynamic platform 511, the static platform 513, the first set of electrical connections 515, the second set of electrical connections 517, a first set of flexure arms 818a, a second set of flexure arms 818b, a third set of flexure arms 818c, a fourth set of flexure arms 818d, the flexure arms 519a, the different flexure arms 519b, the other different flexure arms 519c, and electrical traces 821 for each flexure arm for each of the sets of flexure arms. The dynamic platform 511 may include one or more same or similar features as the dynamic platform 221 illustrated in FIG. 4. The static platform 513 may include one or more same or similar features as the static platform 215 illustrated in FIG. 4. The flexure arms 519a, the different flexure arms 519b, and the other different flexure arms 519c may include one or more same or similar features as the flexure arms 224 illustrated in FIG. 4. The electrical traces 821 may include one or more same or similar features as the electrical traces 416 illustrated in FIG. 4. For example, the electrical traces 821 may be used to provide electronic communication between the static platform 513 and the dynamic platform 511. The first set of electrical connections 515 and/or the second set of electrical connections 517 may be used to connect the flexure 800 (e.g., and an image sensor in electronic communication with the flexure 800, and one or more electronic components in electronic communication with the flexure 800) with one or more other electronic systems of a camera.

The flexure 800 may include four quadrants including the first quadrant 501, the second quadrant 502, the third quadrant 503, and the fourth quadrant 504. Each of the quadrants may include a set of flexure arms having electrical traces. For example, the first quadrant 501 may include the first set of flexure arms 818a, the second quadrant 502 may include the second set of flexure arms 818b, the third quadrant 503 may include the third set of flexure arms 818c, and the fourth quadrant 504 may include the fourth set of flexure arms 818d. The sets of flexure arms of respective quadrants may include at least one flexure arm 519a. The flexure arms 519a may have a same or similar (e.g., common) attributes (e.g., a same or similar base width, a same or similar electrical trace width, a same or similar electrical trace distance spacing, a same or similar insulation layer thickness, a same or similar quantity of electrical traces, a same or similar material forming an electrical trace, a same or similar insulation layer material, and/or the like). In some aspects, the flexure arms 519a may have a same flexure arm type. As described herein, the flexure arms 519a may have at least one different attributed compared to different flexure arms 519b and compared to other different flexure arms 519c.

In some aspects, the sets of flexure arms in the respective quadrants may have a respective stiffnesses due to the attributes of the individual flexure arms. For example, as shown in FIG. 8, because the second set of flexure arms 818b and the fourth set of flexure arms 818d (e.g., diagonal the flexure 800 from each other) include only the flexure arms 519a while also having respective same or similar lengths, the second set of flexure arms 818b may have a same or similar stiffness compared to the fourth set of flexure arms 818d. Thus, in some instances, the first set of flexure arms 818a and the third set of flexure arms 818d (e.g., diagonal the flexure 800 from each other) may also include only the flexure arms 519a while also having respective same or similar lengths. Like the second set of flexure arms 818b and the fourth set of flexure arms 818d, the first set of flexure arms 818a may have a same or similar stiffness compared to the third set of flexure arms 818c. In this case, the sets of flexure arms in each of the respective quadrants may have a same or similar relative stiffness. Having a same or similar relative stiffness between the sets of flexure arms in each of the respective quadrants may provide a level of function of the OIS VCM and/or the AF VCM, as described herein.

In some aspects, the flexure 800 may include one or more different flexure arms 519b (e.g., that are different from the flexure arms 519a) and one or more other different flexure arms 519c (e.g., that are different from the flexure arms 519a and the different flexure arms 519b). For example, the first set of flexure arms 818a may include two different flexure arms 519b. The different flexure arms 519b may be a different flexure arm type compared to the flexure arms 519a. In some aspects, the two different flexure arms 519b may have a different impedance (e.g., a lesser impedance) and/or a different stiffness (e.g., a greater stiffness) compared to the flexure arms 519a. For example, to achieve a different impedance, the two different flexure arms 519b may have at least one different attribute compared to the flexure arms 519a. For instance, the two different flexure arms 519b may include a different base width, a different electrical trace width, a different electrical trace distance spacing, a different insulation layer thickness, a different quantity of electrical traces, a different material forming an electrical trace, a different insulation layer material, and/or the like compared to the flexure arms 519a. As another example, to achieve a lower impedance, the two different flexure arms 519b may include at least one of a greater base width, a greater electrical trace width, a greater electrical trace distance spacing (e.g., to reduce cross talk), and/or the like compared to the flexure arms 519a. In some aspects, due to a difference between one or more attributes of the flexure arms 519a and the different flexure arms 519b, the two different flexure arms 519b may have a different stiffness (e.g., per unit length) compared to a stiffness of the flexure arms 519a. For instance, the two different flexure arms 519b may include a base thickness that is greater than a base thickness of the flexure arms 519a, an electrical trace width or cross-section that is greater than an electrical trace width or cross-section of the flexure arms 519a, and/or the like. Thus, the two different flexure arms 519b may each have a lesser impedance an/or a greater stiffness compared to an impedance and/or a stiffness of each of the flexure arms 519a. In some aspects, the different flexure arm(s) 519b may be used to route image data from an image sensor. In some aspects, the flexure arm(s) 519a may be used route other data between the static platform and the dynamic platform.

Similarly, other different flexure arms 519c may be a different flexure arm type compared to the flexure arms 519a and the different flexure arm 519b. For example, the other different flexure arms 519c may have at least one different attribute compared to the flexure arms 519a and compared to the different flexure arms 519b. In some aspects, the other different flexure arms 519c may have a different impedance (e.g., a lesser impedance) and/or a different stiffness (e.g., a greater stiffness) compared to the flexure arms 519a and the different flexure arms 519b. For example, to achieve a different impedance, the other different flexure arms 519c may have at least one different attribute compared to the flexure arms 519a and the different flexure arms 519b. For instance, the other different flexure arms 519c may include a different base width, a different electrical trace width, a different electrical trace distance spacing, a different insulation layer thickness, a different quantity of electrical traces, a different material forming an electrical trace, a different insulation layer material, and/or the like compared to the flexure arms 519a and the different flexure arms 519b. As another example, to achieve a lower impedance, the other different flexure arms 519c may include at least one of a greater base width, a greater electrical trace width, a greater electrical trace distance spacing (e.g., to reduce cross talk), and/or the like compared to the flexure arms 519a and the different flexure arms 519b. In some aspects, due to a difference between one or more attributes of the other different flexure arms 519c, the flexure arms 519a, and the different flexure arms 519b, the other different flexure arms 519c may have a different stiffness (e.g., per unit length) compared to a stiffness of the flexure arms 519a and the different flexure arms 519b. For instance, the other different flexure arms 519c may include a base thickness that is greater than a base thickness of the flexure arms 519a and the different flexure arms 519b, an electrical trace width or cross-section that is greater than an electrical trace width or cross-section of the flexure arms 519a and the different flexure arms 519b, and/or the like. Thus, the different flexure arms 519c may have a lesser impedance an/or a greater stiffness compared to an impedance and/or a stiffness of the flexure arms 519a and the different flexure arms 519b.

In some aspects, due to a difference between one or more attributes of the flexure arms 519a, the different flexure arms 519b, the other different flexure arms 519c, the different flexure arms 519b may have a different stiffness (e.g., per unit length) compared to a stiffness of the flexure arms 519a and the other different flexure arms 519c may have a different stiffness (e.g., per unit length) compared to a stiffness of the flexure arms 519a and the different flexure arm 519b. For instance, the different flexure arms 519b may include a base thickness that is greater than a base thickness of the flexure arms 519a. Thus, the different flexure arms 519b may have a greater stiffness compared to a stiffness of the flexure arms 519a. Also, the other different flexure arms 519c may include a base thickness that is greater than a base thickness of the flexure arms 519a and less than a base thickness of the different flexure arms 519b. Thus, the different flexure arms 519b may have a greater stiffness compared to a stiffness of the flexure arms 519a and the other different flexure arms 519c may have a greater stiffness compared to a stiffness of the flexure arms 519a and a lesser stiffness compared to the stiffness of the different flexure arms 519b.

As shown in FIG. 8, the first set of flexure arms 818a may include two different flexure arms 519b. The two different flexure arms 519b in the first set of flexure arms 818a may provide HS-DLs for electronic communication between the dynamic platform 511 and the static platform 513. The two different flexure arms 519b of the first set of flexure arms 818a may include one or more attributes that provide a greater stiffness compared to the stiffness of the flexure arms 519a. Thus, because the first set of flexure arms 818a includes the two different flexure arms 519b, the first set of flexure arms 818a may have a greater stiffness (e.g., combined stiffness) compared to the second set of flexure arms 818b and the fourth set of flexure arms 818d. However, to maintain a level of function of the OIS VCM and/or the AF VCM, as described herein, the first set of flexure arms 818a may have a same or similar stiffness as the third set of flexure arms 818c.

In some aspects, one or more flexure arms 519a may be removed from the flexure 800 so that the first set of flexure arms 818a includes a same or similar stiffness compared to the stiffness of the third set of flexure arms 818c. For instance, the first set of flexure arms 818a may include the two different flexure arms 519b and a lesser total quantity of flexure arms compared to the third set of flexure arms 818c (e.g., when having only flexure arms 519a). Thus, the first set of flexure arms 818a with the two different flexure arm 519b but with lesser total flexure arms compared to the third set of flexure arms 818c may have a same or similar stiffness as the third set of flexure arms 818c (e.g., having only flexure arms 519a).

In some aspects, one or more different flexure arms 519b and one or more other different flexure arms 519c may replace one or more flexure arms 519a of the flexure 800 so that the first set of flexure arms 818a may include a same or similar stiffness compared to the stiffness of the third set of flexure arms 818c. For instance, the first set of flexure arms 818a may include flexure arms 519a and the two different flexure arm 519b. Thus, when the third set of flexure arms 818c include only the flexure arms 519a, the first set of flexure arms 818a may have a greater combined stiffness compared to the third set of flexure arms 818c. However, as shown in FIG. 8, the third set of flexure arms 818c includes the flexure arms 519a and three other different flexure arm 519c. In some instances, the combined stiffness of the first set of flexure arms 818a including the flexure arms 519a and the two different flexure arms 519b and the combined stiffness of the third set of flexure arms 818c including the flexure arms 519a and the three other different flexure arms 519c may be a same or similar stiffness. With this configuration, the first set of flexure arms 818a and the third set of flexure arms 818c may have a same or similar stiffness (e.g., a combined stiffness) while also having a different stiffness (e.g., different combined stiffnesses) from the second set of flexure arms 818b and the fourth set of flexure arms 818d. With the first set of flexure arms 818a and the third set of flexure arms 818c having the same or similar stiffness, HS-DLs through the different flexure arms 519b and the other different flexure arms 519c may be provided while also maintaining a level of function of the OIS VCM and/or the AF VCM.

Figure 9:
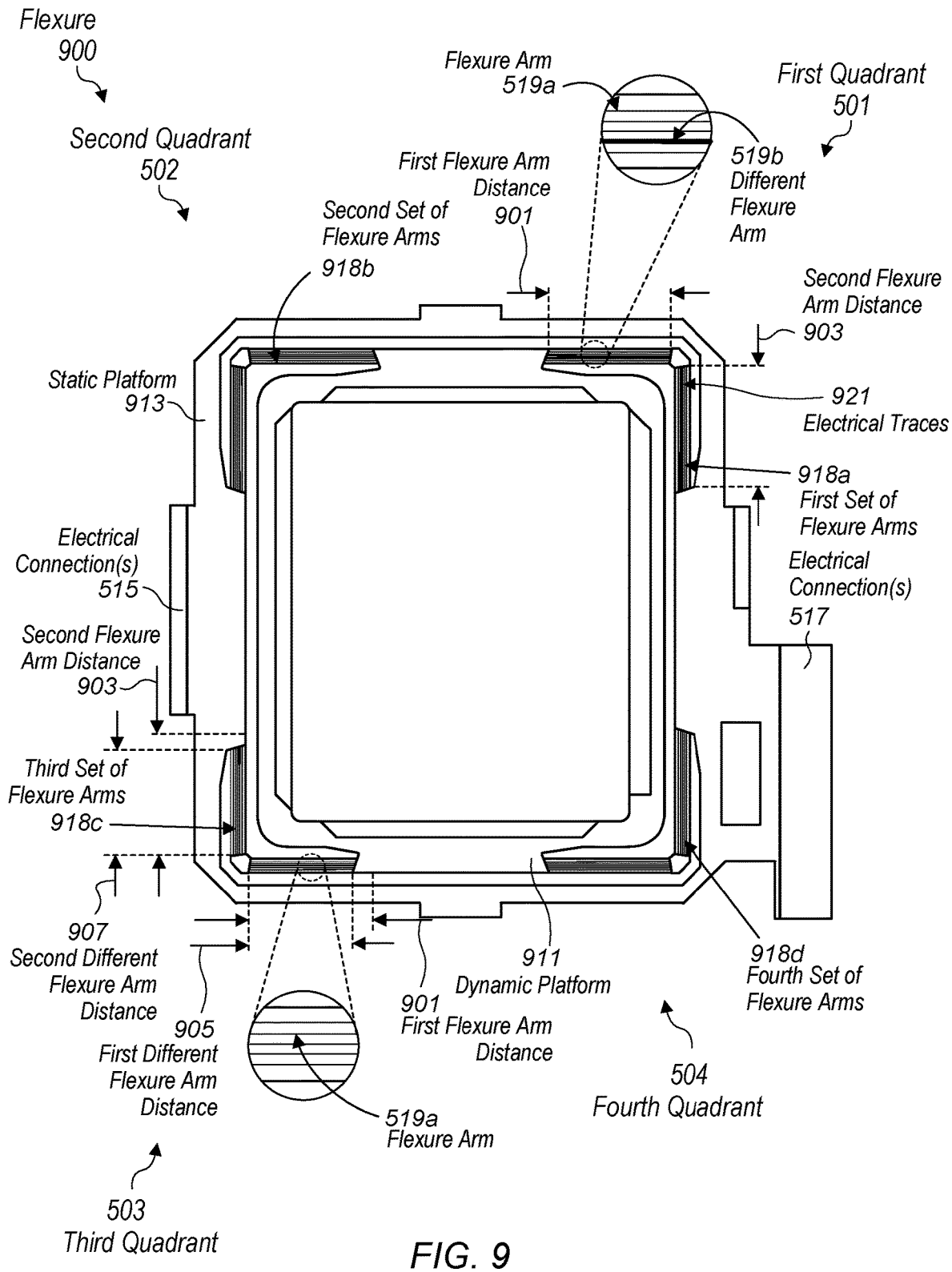
FIG. 9 illustrates an overhead view of an example flexure, in accordance with some embodiments.

In addition to or as an alternative to removing flexure arms 519a and/or replacing flexure arms 519a with one or more different flexure arms 519b and/or with one or more other different flexure arms 519c, as described herein, a length of the flexure arms 519a, a length of the different flexure arms 519b, and/or a length of the flexure arms 519c may be adjusted or modified to change a stiffness of the sets of flexure arms in the respective quadrants. FIG. 9 illustrates an overhead view of an example flexure 900, in accordance with some embodiments. The flexure 900 may be combined with and/or include one or more same or similar features as the features described with respect to or illustrated in FIGS. 1, 2A, 2B, 3, 4, 5, 6A, 6B. 7, 8, 10, 11, 12, and 13.

As shown in FIG. 9, the flexure 900 includes a dynamic platform 911, a static platform 913, the first set of electrical connections 515, the second set of electrical connections 517, a first set of flexure arms 918a, a second set of flexure arms 918b, a third set of flexure arms 918c, a fourth set of flexure arms 818d, the flexure arms 519a, the different flexure arms 519b, and electrical traces 921 for each flexure arm for each of the sets of flexure arms. The dynamic platform 911 may include one or more same or similar features as the dynamic platform 221 illustrated in FIG. 4 and/or the dynamic platform 511 illustrated in FIGS. 5, 7, and 8. The static platform 913 may include one or more same or similar features as the static platform 215 illustrated in FIG. 4 and/or the static platform 513 illustrated in FIGS. 5, 7, and 8. The flexure arms 519a and the different flexure arms 519b may include one or more same or similar features as the flexure arms 224 illustrated in FIG. 4. The electrical traces 921 may include one or more same or similar features as the electrical traces 416 illustrated in FIG. 4. For example, the electrical traces 921 may be used to provide electronic communication between the static platform 913 and the dynamic platform 911. The first set of electrical connections 515 and/or the second set of electrical connections 517 may be used to connect the flexure 900 (e.g., and an image sensor in electronic communication with the flexure 900, and one or more electronic components in electronic communication with the flexure 900) with one or more other electronic systems of a camera.

The flexure 900 may include four quadrants including the first quadrant 501, the second quadrant 502, the third quadrant 503, and the fourth quadrant 504. Each of the quadrants may include a set of flexure arms having electrical traces. For example, the first quadrant 501 may include the first set of flexure arms 918a, the second quadrant 502 may include the second set of flexure arms 918b, the third quadrant 503 may include the third set of flexure arms 918c, and the fourth quadrant 504 may include the fourth set of flexure arms 918d. The sets of flexure arms of respective quadrants may include at least one flexure arm 519a. The flexure arms 519a may have a same or similar (e.g., common) attributes (e.g., a same or similar base width, a same or similar electrical trace width, a same or similar electrical trace distance spacing, a same or similar insulation layer thickness, a same or similar quantity of electrical traces, a same or similar material forming an electrical trace, a same or similar insulation layer material, and/or the like). In some aspects, the flexure arms 519a may have a same flexure arm type. As described herein, the flexure arms 519a may have at least one different attributed compared to different flexure arms 519b.

In some aspects, the sets of flexure arms in the respective quadrants may have a respective stiffnesses due to the attributes of the individual flexure arms. For example, as shown in FIG. 9, because the second set of flexure arms 918b and the fourth set of flexure arms 918d (e.g., diagonal the flexure 900 from each other) include only the flexure arms 519a while also having respective same or similar lengths, the second set of flexure arms 918b may have a same or similar stiffness compared to the fourth set of flexure arms 918d. Thus, in some instances, the first set of flexure arms 918a and the third set of flexure arms 918d (e.g., diagonal the flexure 900 from each other) may also include only the flexure arms 519a while also having respective same or similar lengths. Like the second set of flexure arms 918b and the fourth set of flexure arms 918d, the first set of flexure arms 918a may have a same or similar stiffness compared to the third set of flexure arms 918c. In this case, the sets of flexure arms in each of the respective quadrants may have a same or similar relative stiffness. Having a same or similar relative stiffness between the sets of flexure arms in each of the respective quadrants may provide a level of function of the OIS VCM and/or the AF VCM, as described herein.

In some aspects, the flexure 900 may include one or more different flexure arms 519b (e.g., that are different from the flexure arms 519a). For example, the first set of flexure arms 918a may include a different flexure arm 519b. The different flexure arm 519b may be a different flexure arm type compared to the flexure arms 519a. In some aspects, the different flexure arm 519b may have a different impedance (e.g., a lesser impedance) and/or a different stiffness (e.g., a greater stiffness) compared to the flexure arms 519a. For example, to achieve a different impedance, the different flexure arm 519b may have at least one different attribute compared to the flexure arms 519a. For instance, the different flexure arms 519b may include a different base width, a different electrical trace width, a different electrical trace distance spacing, a different insulation layer thickness, a different quantity of electrical traces, a different material forming an electrical trace, a different insulation layer material, and/or the like compared to the flexure arm 519a. As another example, to achieve a lower impedance, the different flexure arm 519b may include at least one of a greater base width, a greater electrical trace width, a greater electrical trace distance spacing (e.g., to reduce cross talk), and/or the like compared to the flexure arm 519a. In some aspects, due to a difference between one or more attributes of the flexure arm 519a and the different flexure arm 519b, the different flexure arm 519b may have a different stiffness (e.g., per unit length) compared to a stiffness of the flexure arm 519a. For instance, the different flexure arms 519b may include a base thickness that is greater than a base thickness of the flexure arm 519a, an electrical trace width or cross-section that is greater than an electrical trace width or cross-section of the flexure arm 519a, and/or the like. Thus, the different flexure arm 519b may each have a lesser impedance an/or a greater stiffness compared to an impedance and/or a stiffness of each of the flexure arm 519a. In some aspects, the different flexure arm(s) 519b may be used to route image data from an image sensor. In some aspects, the flexure arm(s) 519a may be used route other data between the static platform and the dynamic platform.

As shown in FIG. 9, the first set of flexure arms 918a may include a different flexure arm 519b. The different flexure arm 519b in the first set of flexure arms 918a may provide HS-DLs for electronic communication between the dynamic platform 911 and the static platform 913. The different flexure arm 519b of the first set of flexure arms 918a may include one or more attributes that provide a greater stiffness compared to the stiffness of the flexure arms 519a. Thus, because the first set of flexure arms 918a includes the different flexure arm 519b, the first set of flexure arms 918a may have a greater stiffness (e.g., combined stiffness) compared to the second set of flexure arms 918b and the fourth set of flexure arms 918d. However, to maintain a level of function of the OIS VCM and/or the AF VCM, as described herein, the first set of flexure arms 918a may have a same or similar stiffness as the third set of flexure arms 918c.

In some aspects, the first set of flexure arms 918a may be extended or made longer than the third set of flexure arms 918c. For instance, the first set of flexure arms 918a may have a first flexure arm distance 901 and a second flexure arm distance 903. The static platform 913 and the dynamic platform 911 may be shortened or reduced in the first quadrant 501 so that first set of flexure arms 918a extend beyond the first flexure distance 901 and the second flexure arm distance 903 to couple the static platform 913 with the dynamic platform 911. The first flexure arm distance 901 and the second flexure arm distance 903 may be extended or increased to reduce the stiffness of the first set of flexure arms 918a to be the same as or at least similar to a stiffness of the third set of flexure arms 918c. In some aspects, the third set of flexure arms 918c may be shortened or made shorter than the first set of flexure arms 918a. For instance, the static platform 913 and the dynamic platform 911 may be extended in the third quadrant 503 so that the third set of flexure arms 918c may be reduced or shortened from the first flexure arm distance 901 to the first different flexure arm distance 905 and from the second flexure arm distance 903 to the second different flexure arm distance 907. Reducing the length of the third set of flexure arms 918c may increase the stiffness of the third set of flexure arms 918c to be the same as or at least similar to a stiffness of the first set of flexure arms 918a. With the first set of flexure arms 918a and the third set of flexure arms 918c having the same or similar stiffness, a HS-DL through the different flexure arms 519b in first set of flexure arms 518a may be provided while also maintaining a level of function of the OIS VCM and/or the AF VCM.

Figure 10:
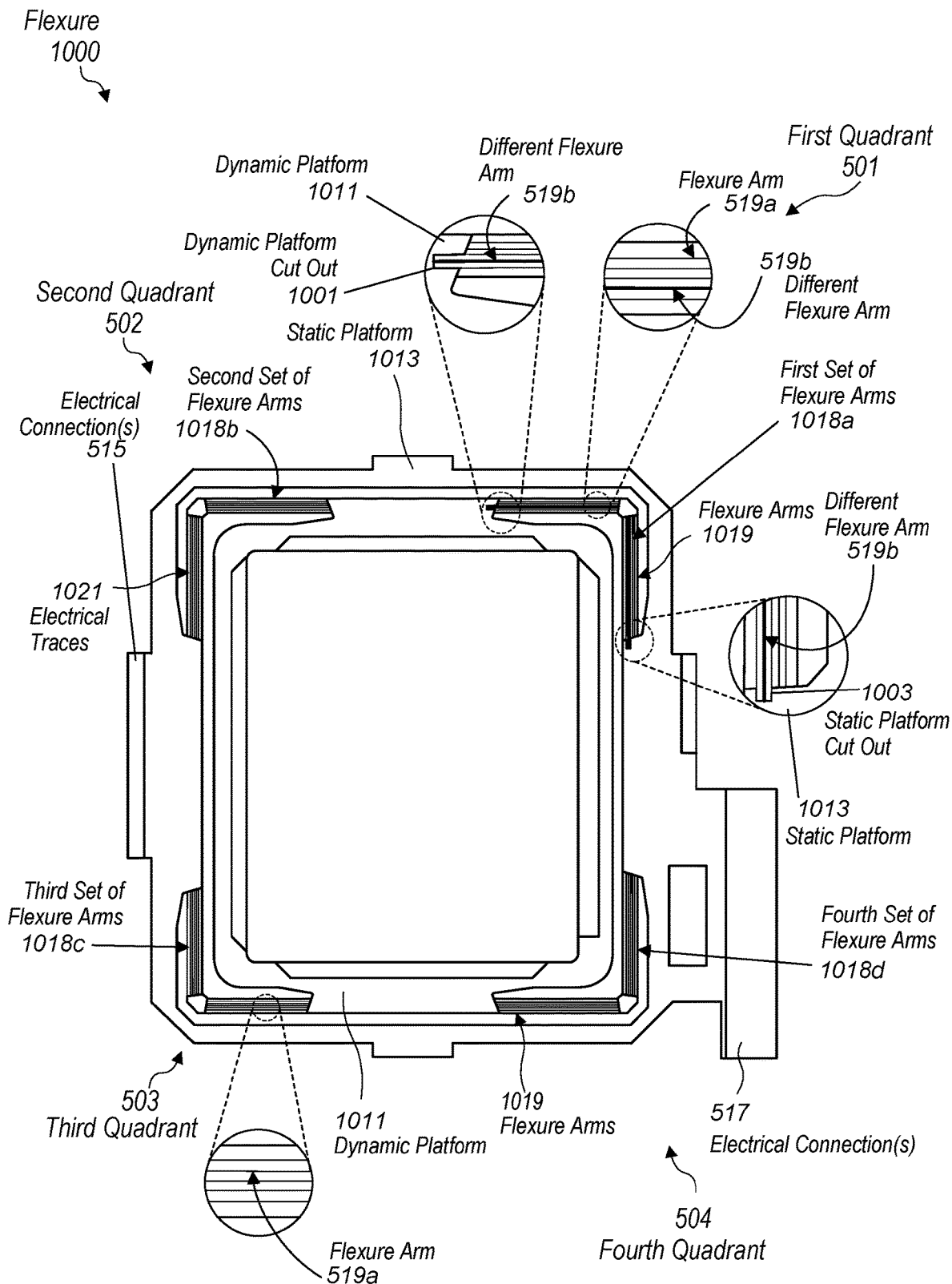
FIG. 10 illustrates an overhead view of an example flexure, in accordance with some embodiments.

FIG. 10 illustrates an overhead view of an example flexure 1000, in accordance with some embodiments. The flexure 1000 may be combined with and/or include one or more same or similar features as the features described with respect to or illustrated in FIGS. 1, 2A, 2B, 3, 4, 5, 6A, 6B, 7, 8, 9, 11, 12, and 13. As shown in FIG. 10, the flexure 1000 includes a dynamic platform 1011, a static platform 1013, the first set of electrical connections 515, the second set of electrical connections 517, a first set of flexure arms 1018a, a second set of flexure arms 1018b, a third set of flexure arms 1018c, a fourth set of flexure arms 1018d, the flexure arms 519a, the different flexure arms 519b, and electrical traces 1021 for each flexure arm for each of the sets of flexure arms. The dynamic platform 1011 may include one or more same or similar features as the dynamic platform 221 illustrated in FIG. 4, the dynamic platform 511 illustrated in FIGS. 5, 7, and 8, and/or the dynamic platform 911 illustrated in FIG. 9. The static platform 1013 may include one or more same or similar features as the static platform 215 illustrated in FIG. 4, the static platform 513 illustrated in FIGS. 5, 7, and 8, and/or the static platform 913 illustrated in FIG. 9. The flexure arms 519a and the different flexure arms 519b may include one or more same or similar features as the flexure arms 224 illustrated in FIG. 4. The electrical traces 1021 may include one or more same or similar features as the electrical traces 416 illustrated in FIG. 4. For example, the electrical traces 1021 may be used to provide electronic communication between the static platform 1013 and the dynamic platform 1011. The first set of electrical connections 515 and/or the second set of electrical connections 517 may be used to connect the flexure 1000 (e.g., and an image sensor in electronic communication with the flexure 1000, and one or more electronic components in electronic communication with the flexure 1000) with one or more other electronic systems of a camera.

The flexure 1000 may include four quadrants including the first quadrant 501, the second quadrant 502, the third quadrant 503, and the fourth quadrant 504. Each of the quadrants may include a set of flexure arms having electrical traces. For example, the first quadrant 501 may include the first set of flexure arms 1018a, the second quadrant 502 may include the second set of flexure arms 1018b, the third quadrant 503 may include the third set of flexure arms 1018c, and the fourth quadrant 504 may include the fourth set of flexure arms 1018d. The sets of flexure arms of respective quadrants may include at least one flexure arm 519a. The flexure arms 519a may have a same or similar (e.g., common) attributes (e.g., a same or similar base width, a same or similar electrical trace width, a same or similar electrical trace distance spacing, a same or similar insulation layer thickness, a same or similar quantity of electrical traces, a same or similar material forming an electrical trace, a same or similar insulation layer material, and/or the like). In some aspects, the flexure arms 519a may have a same flexure arm type. As described herein, the flexure arms 519a may have at least one different attributed compared to different flexure arms 519b.

In some aspects, the sets of flexure arms in the respective quadrants may have a respective stiffnesses due to the attributes of the individual flexure arms. For example, as shown in FIG. 10, because the second set of flexure arms 1018b and the fourth set of flexure arms 1018d (e.g., diagonal the flexure 1000 from each other) include only the flexure arms 519a while also having respective same or similar lengths, the second set of flexure arms 1018b may have a same or similar stiffness compared to the fourth set of flexure arms 1018d. Thus, in some instances, the first set of flexure arms 1018a and the third set of flexure arms 1018d (e.g., diagonal the flexure 1000 from each other) may also include only the flexure arms 519a while also having respective same or similar lengths. Like the second set of flexure arms 1018b and the fourth set of flexure arms 1018d, the first set of flexure arms 1018a may have a same or similar stiffness compared to the third set of flexure arms 1018c. In this case, the sets of flexure arms in each of the respective quadrants may have a same or similar relative stiffness. Having a same or similar relative stiffness between the sets of flexure arms in each of the respective quadrants may provide a level of function of the OIS VCM and/or the AF VCM, as described herein.

In some aspects, the flexure 1000 may include one or more different flexure arms 519b (e.g., that are different from the flexure arms 519a). For example, the first set of flexure arms 1018a may include a different flexure arm 519b. The different flexure arm 519b may be a different flexure arm type compared to the flexure arms 519a. In some aspects, the different flexure arm 519b may have a different impedance (e.g., a lesser impedance) and/or a different stiffness (e.g., a greater stiffness) compared to the flexure arms 519a. For example, to achieve a different impedance, the different flexure arm 519b may have at least one different attribute compared to the flexure arms 519a. For instance, the different flexure arms 519b may include a different base width, a different electrical trace width, a different electrical trace distance spacing, a different insulation layer thickness, a different quantity of electrical traces, a different material forming an electrical trace, a different insulation layer material, and/or the like compared to the flexure arm 519a. As another example, to achieve a lower impedance, the different flexure arm 519b may include at least one of a greater base width, a greater electrical trace width, a greater electrical trace distance spacing (e.g., to reduce cross talk), and/or the like compared to the flexure arm 519a. In some aspects, due to a difference between one or more attributes of the flexure arm 519a and the different flexure arm 519b, the different flexure arm 519b may have a different stiffness (e.g., per unit length) compared to a stiffness of the flexure arm 519a. For instance, the different flexure arms 519b may include a base thickness that is greater than a base thickness of the flexure arm 519a, an electrical trace width or cross-section that is greater than an electrical trace width or cross-section of the flexure arm 519a, and/or the like. Thus, the different flexure arm 519b may each have a lesser impedance an/or a greater stiffness compared to an impedance and/or a stiffness of each of the flexure arm 519a. In some aspects, the different flexure arm(s) 519b may be used to route image data from an image sensor. In some aspects, the flexure arm(s) 519a may be used route other data between the static platform and the dynamic platform.

As shown in FIG. 10, the first set of flexure arms 1018a may include a different flexure arm 519b. The different flexure arm 519b in the first set of flexure arms 1018a may provide HS-DLs for electronic communication between the dynamic platform 1011 and the static platform 1013. The different flexure arm 519b of the first set of flexure arms 1018a may include one or more attributes that provide a greater stiffness compared to the stiffness of the flexure arms 519a. Thus, because the first set of flexure arms 1018a includes the different flexure arm 519b, the first set of flexure arms 1018a may have a greater stiffness (e.g., combined stiffness) compared to the second set of flexure arms 1018b and the fourth set of flexure arms 1018d. However, to maintain a level of function of the OIS VCM and/or the AF VCM, as described herein, the first set of flexure arms 1018a may have a same or similar stiffness as the third set of flexure arms 1018c.

In some aspects, at least one flexure arm 519a of the third set of flexure arms 1018c may be shortened or made shorter relative to the remaining flexure arms 519a in the third set of flexure arms 1018c to increase the stiffness of the at least one flexure arm 519a and thereby increase the combined stiffness of the third set of flexure arms 1018c. For example, a portion of the static platform 1013 and a portion of the dynamic platform 1011 may be extended to form extensions at the location of the at least one flexure arm 519a of the third set of flexure arms 1018c. Remaining portions of the static platform 1013 and remaining portions of the dynamic platform 1011 may not be extended at the locations of remaining flexure arms 519a of the third set of flexure arms 1018c. The extensions may create a tooth that extends the static platform 1013 and a tooth that extends the dynamic platform 1011 at the locations where the flexure arm 519a couples to the static platform 1013 and the dynamic platform 1011, respectively. By shortening the length of one flexure arm 519a of the third set of flexure arms 1018c, the third set of flexure arms 1018c may have a same or similar stiffness as a stiffness of the first set of flexure arms 1018a (e.g., having the different flexure arm 519b).

In some aspects, the different flexure arm 519b in the first set of flexure arms 1018a may be extended or made longer to reduce a stiffness of the different flexure arm 519b. Reducing a stiffness of the different flexure arm 519b in the first set of flexure arms 1018a may reduce a combined stiffness of the first set of flexure arms 1018a so that the first set of flexure arms 1018a has a stiffness that is the same as or at least similar to a stiffness of the third set of flexure arms 1018c. As shown in FIG. 10, the static platform 1013 includes a static platform cutout 1003 aligned with the location where the different flexure arm 519b couples with the static platform 1013. Similarly, the dynamic platform 1011 includes a dynamic platform cutout 1001 aligned with the location where the different flexure arm 519b couples with the dynamic platform 1011. The dynamic platform cutout 1001 and the static platform cutout 1003 may extend the length of the different flexure arm 519b and thereby reduce a stiffness of the different flexure arm 519b. Thus, by extending the length of the different flexure arm 519b, the first set of flexure arms 1018a may have a same or similar stiffness as the third set of flexure arms 1018c (e.g., having only flexure arms 519a). With the first set of flexure arms 1018a and the third set of flexure arms 1018c having the same or similar stiffness, a HS-DL through the different flexure arm 519b in first set of flexure arms 1018a may be provided while also maintaining a level of function of the OIS VCM and/or the AF VCM.

Figure 11:
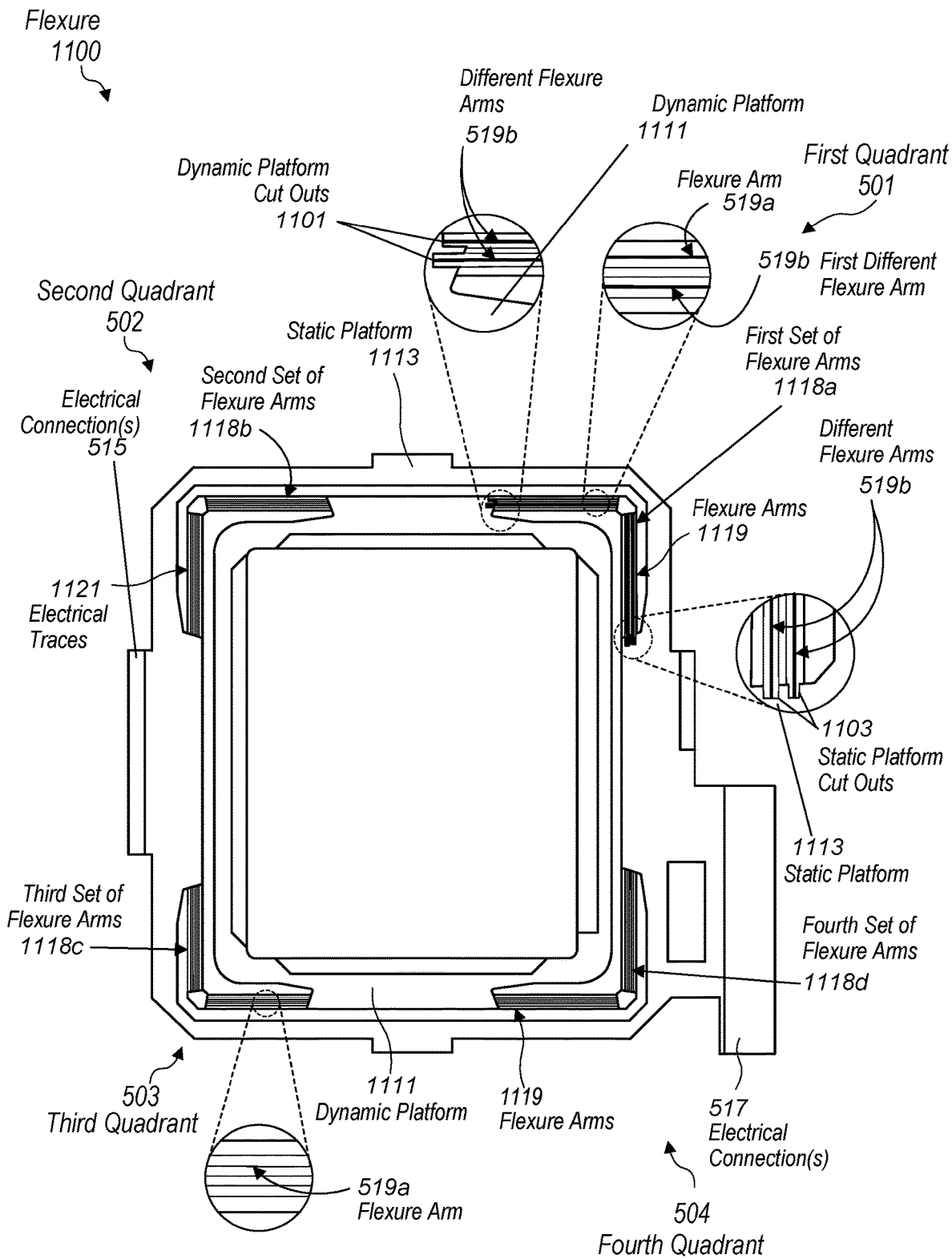
FIG. 11 illustrates an overhead view of an example flexure, in accordance with some embodiments.

FIG. 11 illustrates an overhead view of an example flexure, in accordance with some embodiments. The flexure 1100 may be combined with and/or include one or more same or similar features as the features described with respect to or illustrated in FIGS. 1, 2A, 2B, 3, 4, 5, 6A, 6B, 7, 8, 9, 10, 12, and 13. As shown in FIG. 11, the flexure 1100 includes a dynamic platform 1111, a static platform 1113, the first set of electrical connections 515, the second set of electrical connections 517, a first set of flexure arms 1118a, a second set of flexure arms 1118b, a third set of flexure arms 1118c, a fourth set of flexure arms 1118d, the flexure arms 519a, the different flexure arms 519b, and electrical traces 1121 for each flexure arm for each of the sets of flexure arms. The dynamic platform 1111 may include one or more same or similar features as the dynamic platform 221 illustrated in FIG. 4, the dynamic platform 511 illustrated in FIGS. 5, 7, and 8, the dynamic platform 911 illustrated in FIG. 9, and/or the dynamic portion 1011 illustrated in FIG. 10. The static platform 1013 may include one or more same or similar features as the static platform 215 illustrated in FIG. 4, the static platform 513 illustrated in FIGS. 5, 7, and 8, the static platform 913 illustrated in FIG. 9, and/or the static platform 1013 illustrated in FIG. 10. The flexure arms 519a and the different flexure arms 519b may include one or more same or similar features as the flexure arms 224 illustrated in FIG. 4. The electrical traces 1121 may include one or more same or similar features as the electrical traces 416 illustrated in FIG. 4. For example, the electrical traces 1121 may be used to provide electronic communication between the static platform 1113 and the dynamic platform 1111. The first set of electrical connections 515 and/or the second set of electrical connections 517 may be used to connect the flexure 1100 (e.g., and an image sensor in electronic communication with the flexure 1100, and one or more electronic components in electronic communication with the flexure 1100) with one or more other electronic systems of a camera.

The flexure 1100 may include four quadrants including the first quadrant 501, the second quadrant 502, the third quadrant 503, and the fourth quadrant 504. Each of the quadrants may include a set of flexure arms having electrical traces. For example, the first quadrant 501 may include the first set of flexure arms 1118a, the second quadrant 502 may include the second set of flexure arms 1118b, the third quadrant 503 may include the third set of flexure arms 1118c, and the fourth quadrant 504 may include the fourth set of flexure arms 1118d. The sets of flexure arms of respective quadrants may include at least one flexure arm 519a. The flexure arms 519a may have a same or similar (e.g., common) attributes (e.g., a same or similar base width, a same or similar electrical trace width, a same or similar electrical trace distance spacing, a same or similar insulation layer thickness, a same or similar quantity of electrical traces, a same or similar material forming an electrical trace, a same or similar insulation layer material, and/or the like). In some aspects, the flexure arms 519a may have a same flexure arm type. As described herein, the flexure arms 519a may have at least one different attributed compared to different flexure arms 519b.

In some aspects, the sets of flexure arms in the respective quadrants may have a respective stiffnesses due to the attributes of the individual flexure arms. For example, as shown in FIG. 11, because the second set of flexure arms 1118b and the fourth set of flexure arms 1118d (e.g., diagonal the flexure 1100 from each other) include only the flexure arms 519a while also having respective same or similar lengths, the second set of flexure arms 1118b may have a same or similar stiffness compared to the fourth set of flexure arms 1118d. Thus, in some instances, the first set of flexure arms 1118a and the third set of flexure arms 1118d (e.g., diagonal the flexure 1100 from each other) may also include only the flexure arms 519a while also having respective same or similar lengths. Like the second set of flexure arms 1118b and the fourth set of flexure arms 1118d, the first set of flexure arms 1118a may have a same or similar stiffness compared to the third set of flexure arms 1118c. In this case, the sets of flexure arms in each of the respective quadrants may have a same or similar relative stiffness. Having a same or similar relative impedance and stiffness between the sets of flexure arms in each of the respective quadrants may provide a level of function of the OIS VCM and/or the AF VCM, as described herein.

In some aspects, the flexure 1100 may include one or more different flexure arms 519b (e.g., that are different from the flexure arms 519a). For example, the first set of flexure arms 1118a may include two different flexure arms 519b. The two different flexure arms 519b may be a different flexure arm type compared to the flexure arms 519a. In some aspects, the two different flexure arms 519b may have a different impedance (e.g., a lesser impedance) and/or a different stiffness (e.g., a greater stiffness) compared to the flexure arms 519a. For example, to achieve a different impedance, the two different flexure arms 519b may have at least one different attribute compared to the flexure arms 519a. For instance, the two different flexure arms 519b may include a different base width, a different electrical trace width, a different electrical trace distance spacing, a different insulation layer thickness, a different quantity of electrical traces, a different material forming an electrical trace, a different insulation layer material, and/or the like compared to the flexure arms 519a. As another example, to achieve a lower impedance, the two different flexure arms 519b may include at least one of a greater base width, a greater electrical trace width, a greater electrical trace distance spacing (e.g., to reduce cross talk), and/or the like compared to the flexure arms 519*a*. In some aspects, due to a difference between one or more attributes of the flexure arms 519*a* and the different flexure arms 519*b*, the two different flexure arms 519*b* may have a different stiffness (e.g., per unit length) compared to a stiffness of the flexure arms 519*a*. For instance, the two different flexure arms 519*b* may include a base thickness that is greater than a base thickness of the flexure arms 519*a*, an electrical trace width or cross-section that is greater than an electrical trace width or cross-section of the flexure arms 519*a*, and/or the like. Thus, the two different flexure arms 519*b* may each have a lesser impedance an/or a greater stiffness compared to an impedance and/or a stiffness of each of the flexure arms 519*a*. In some aspects, the different flexure arm(s) 519*b* may be used to route image data from an image sensor. In some aspects, the flexure arm(s) 519*a* may be used route other data between the static platform and the dynamic platform.

As shown in FIG. 11, the first set of flexure arms 1118*a* may include two different flexure arms 519*b*. The two different flexure arms 519*b* in the first set of flexure arms 1118*a* may provide HS-DLs for electronic communication between the dynamic platform 1111 and the static platform 1113. The two different flexure arms 519*b* of the first set of flexure arms 1118*a* may include one or more attributes that provide a greater stiffness compared to the stiffness of the flexure arms 519*a*. Thus, because the first set of flexure arms 1018*a* includes the two different flexure arms 519*b*, the first set of flexure arms 1118*a* may have a greater stiffness (e.g., combined stiffness) compared to the second set of flexure arms 1118*b* and the fourth set of flexure arms 1118*d*. However, to maintain a level of function of the OIS VCM and/or the AF VCM, as described herein, the first set of flexure arms 1118*a* may have a same or similar stiffness as the third set of flexure arms 1118*c*.

In some aspects, at least one flexure arm 519*a* of the third set of flexure arms 1118*c* may be shortened or made shorter relative to the remaining flexure arms 519*a* in the third set of flexure arms 1118*c* to increase the stiffness of two flexure arms 519*a* and thereby increase the combined stiffness of the third set of flexure arms 1118*c*. For example, a portion of the static platform 1113 and a portion of the dynamic platform 1111 may be extended to form extensions at the location of two flexure arms 519*a* of the third set of flexure arms 1118*c*. Remaining portions of the static platform 1113 and remaining portions of the dynamic platform 1111 may not be extended at the locations of remaining flexure arms 519*a* of the third set of flexure arms 1118*c*. The extensions may create teeth that extend the static platform 1113 and teeth that extend the dynamic platform 1111 at the locations where the flexure arms 519*a* couple to the static platform 1113 and the dynamic platform 1111, respectively. By shortening the length of two flexure arm 519*a* of the third set of flexure arms 1118*c*, the third set of flexure arms 1118*c* may have a same or similar stiffness as a stiffness of the first set of flexure arms 1118*a* (e.g., having the two different flexure arms 519*b*).

In some aspects, the different flexure arm 519*b* in the first set of flexure arms 1118*a* may be extended or made longer to reduce a stiffness of the different flexure arm 519*b*. Reducing a stiffness of the different flexure arm 519*b* in the first set of flexure arms 1118*a* may reduce a combined stiffness of the first set of flexure arms 1018*a* so that the first set of flexure arms 1018*a* has a stiffness that is the same as or at least similar to a stiffness of the third set of flexure arms 1018*c*. As shown in FIG. 11, the static platform 1113 includes two static platform cutouts 1103 aligned with the locations where the two different flexure arms 519*b* couple with the static platform 1113. Similarly, the dynamic platform 1111 includes two dynamic platform cutouts 1101 aligned with the locations where the two different flexure arms 519*b* couple with the dynamic platform 1111. The dynamic platform cutouts 1101 and the static platform cutouts 1003 may extend the length of the two different flexure arms 519*b* and thereby reduce a stiffness of the two different flexure arms 519*b*. Thus, by extending the length of the two different flexure arms 519*b*, the first set of flexure arms 1118*a* may have a same or similar stiffness as the third set of flexure arms 1118*c* (e.g., having only flexure arms 519*a*). With the first set of flexure arms 1118*a* and the third set of flexure arms 1118*c* having the same or similar stiffness, a HS-DL through the different flexure arm 519*b* in first set of flexure arms 1118*a* may be provided while also maintaining a level of function of the OIS VCM and/or the AF VCM.

Figure 12:
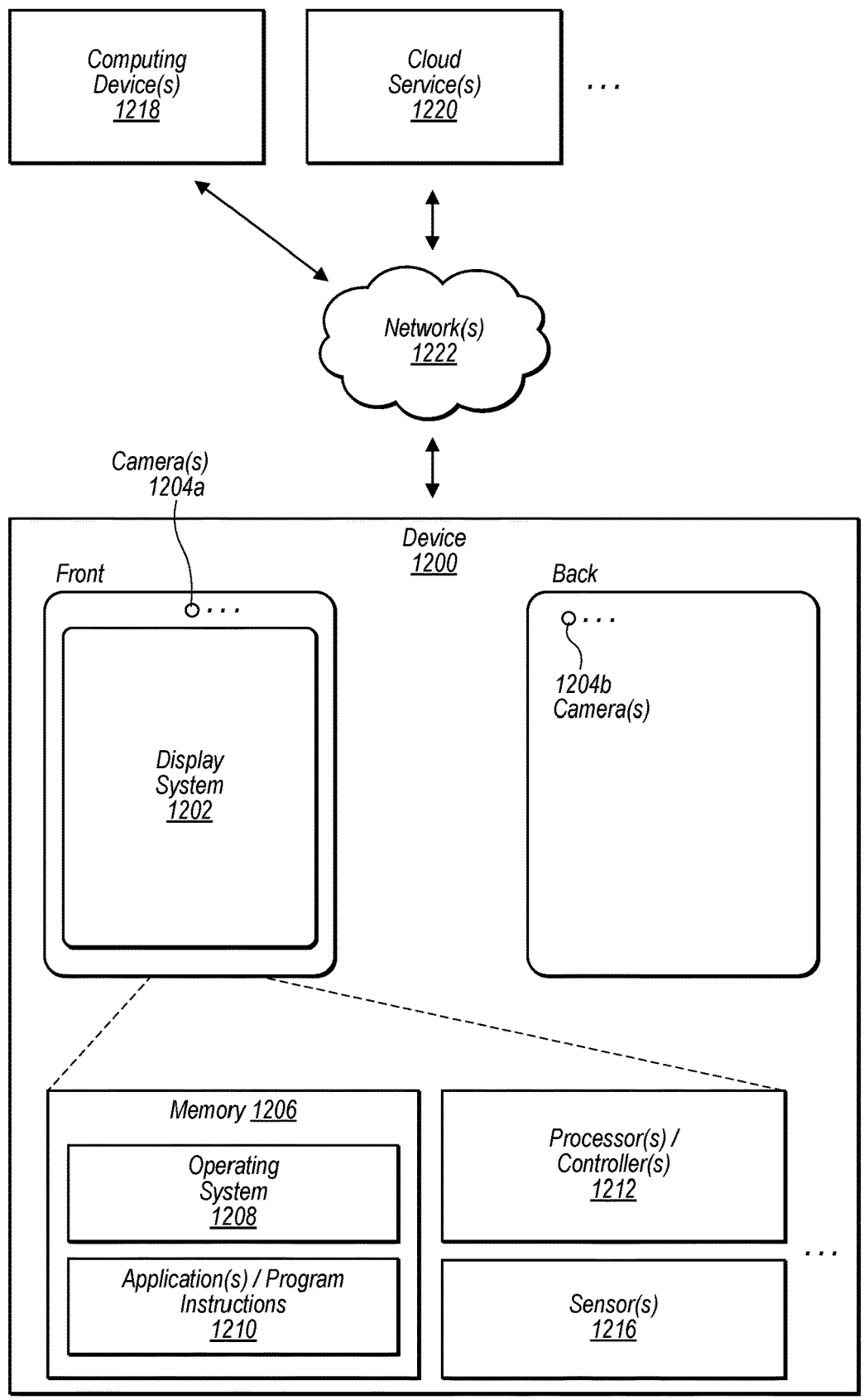
FIG. 12 illustrates a schematic representation of an example device that may include a camera, in accordance with some embodiments.

FIG. 12 illustrates a schematic representation of an example device 1900 that may include a camera (e.g., as described herein with respect to FIGS. 1, 2A, 2B, 3, 4, 5, 6A, 6B, 7, 8, 9, 10, 11, and 13), in accordance with some embodiments. In some embodiments, the device 1200 may be a mobile device and/or a multifunction device. In various embodiments, the device 1200 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In some embodiments, the device 1200 may include a display system 1202 (e.g., comprising a display and/or a touch-sensitive surface) and/or one or more cameras 1204. In some non-limiting embodiments, the display system 1202 and/or one or more front-facing cameras 1204*a* may be provided at a front side of the device 1200, e.g., as indicated in FIG. 12. Additionally, or alternatively, one or more rear-facing cameras 1204*b* may be provided at a rear side of the device 1200. In some embodiments comprising multiple cameras 1204, some or all of the cameras may be the same as, or similar to, each other. Additionally, or alternatively, some or all of the cameras may be different from each other. In various embodiments, the location(s) and/or arrangement(s) of the camera(s) 1204 may be different than those indicated in FIG. 12.

Among other things, the device 1200 may include memory 1206 (e.g., comprising an operating system 1208 and/or application(s)/program instructions 1210), one or more processors and/or controllers 1212 (e.g., comprising CPU(s), memory controller(s), display controller(s), and/or camera controller(s), etc.), and/or one or more sensors 1216 (e.g., orientation sensor(s), proximity sensor(s), and/or position sensor(s), etc.). In some embodiments, the device 1200 may communicate with one or more other devices and/or services, such as computing device(s) 1218, cloud service(s) 1220, etc., via one or more networks 1222. For example, the device 1200 may include a network interface (e.g., network interface 1210) that enables the device 1200 to transmit data to, and receive data from, the network(s) 1222. Additionally, or alternatively, the device 1200 may be capable of communicating with other devices via wireless communication using any of a variety of communications standards, protocols, and/or technologies.

Figure 13:
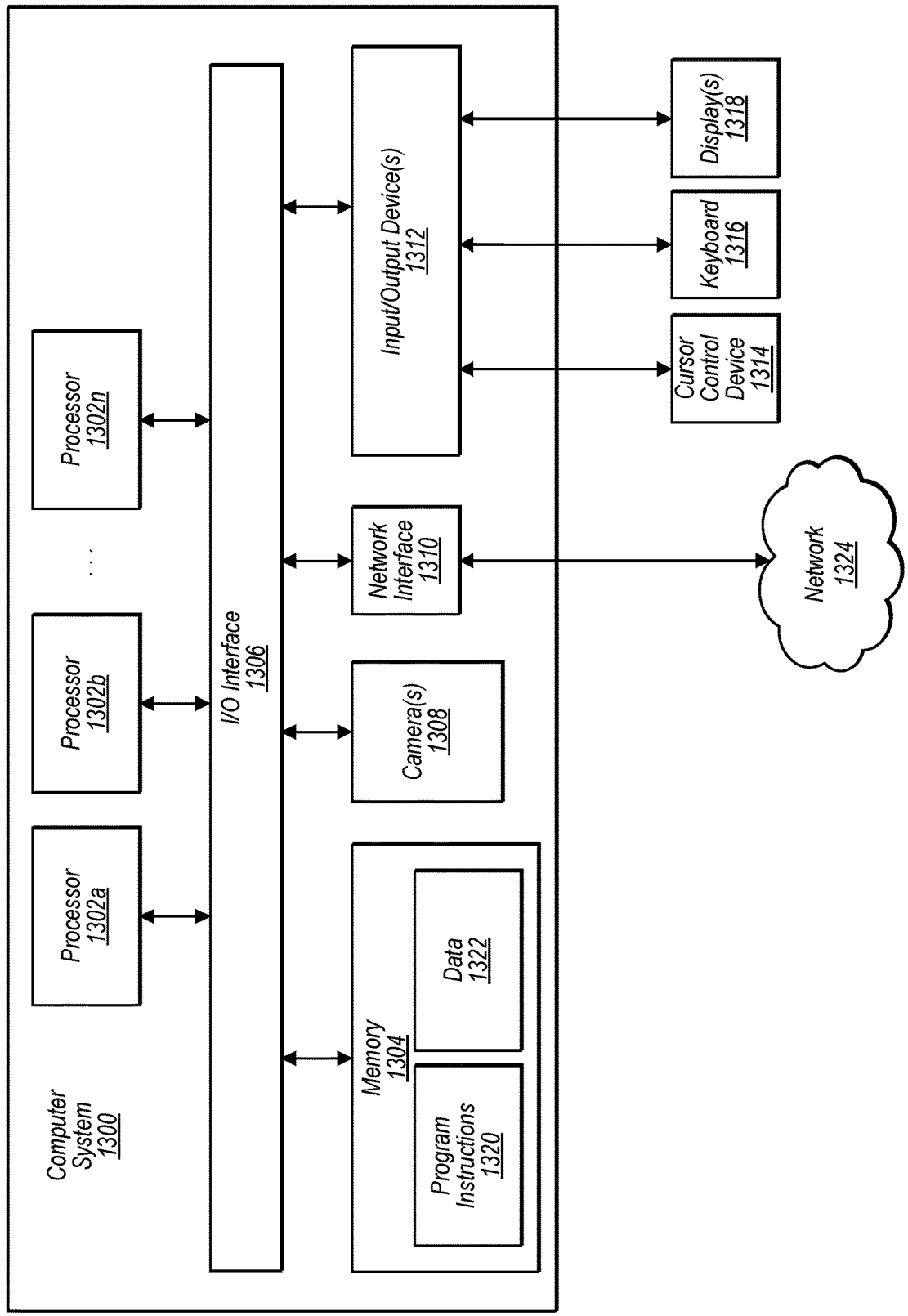
FIG. 13 illustrates a schematic block diagram of an example computing device, referred to as computer system, that may include or host embodiments of a camera, in accordance with some embodiments.

FIG. 13 illustrates a schematic block diagram of an example computing device, referred to as computer system 2000, that may include or host embodiments of a camera (e.g., as described herein with respect to FIGS. 1, 2A, 2B, 3, 4, 5, 6A, 6B, 7, 8, 9, 10, 11, and 12). In addition, computer system 1300 may implement methods for controlling operations of the camera and/or for performing image processing images captured with the camera. In some embodiments, the device 1300 (described herein with reference to FIG. 13) may additionally, or alternatively, include some or all of the functional components of the computer system 1300 described herein.

The computer system 1300 may be configured to execute any or all of the embodiments described above. In different embodiments, computer system 1300 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In the illustrated embodiment, computer system 1300 includes one or more processors 1302 coupled to a system memory 1304 via an input/output (I/O) interface 1306. Computer system 1300 further includes one or more cameras 1308 coupled to the I/O interface 1306. Computer system 1300 further includes a network interface 1310 coupled to I/O interface 1306, and one or more input/output devices 1312, such as cursor control device 1314, keyboard 1316, and display(s) 1318. In some cases, it is contemplated that embodiments may be implemented using a single instance of computer system 1300, while in other embodiments multiple such systems, or multiple nodes making up computer system 1300, may be configured to host different portions or instances of embodiments. For example, in one embodiment some elements may be implemented via one or more nodes of computer system 1300 that are distinct from those nodes implementing other elements.

In various embodiments, computer system 1300 may be a uniprocessor system including one processor 1302, or a multiprocessor system including several processors 1302 (e.g., two, four, eight, or another suitable number). Processors 1302 may be any suitable processor capable of executing instructions. For example, in various embodiments processors 1302 may be general-purpose or embedded processors implementing any of a variety of instruction set architectures (ISAs), such as the x86, PowerPC, SPARC, or MIPS ISAs, or any other suitable ISA. In multiprocessor systems, each of processors 1302 may commonly, but not necessarily, implement the same ISA.

System memory 1304 may be configured to store program instructions 1320 accessible by processor 1302. In various embodiments, system memory 1304 may be implemented using any suitable memory technology, such as static random access memory (SRAM), synchronous dynamic RAM (SDRAM), nonvolatile/Flash-type memory, or any other type of memory. Additionally, existing camera control data 1322 of memory 1304 may include any of the information or data structures described above. In some embodiments, program instructions 1320 and/or data 1322 may be received, sent or stored upon different types of computer-accessible media or on similar media separate from system memory 1304 or computer system 1300. In various embodiments, some or all of the functionality described herein may be implemented via such a computer system 1300.

In one embodiment, I/O interface 1306 may be configured to coordinate I/O traffic between processor 1302, system memory 1304, and any peripheral devices in the device, including network interface 1310 or other peripheral interfaces, such as input/output devices 1312. In some embodiments, I/O interface 1306 may perform any necessary protocol, timing or other data transformations to convert data signals from one component (e.g., system memory 1304) into a format suitable for use by another component (e.g., processor 1302). In some embodiments, I/O interface 1306 may include support for devices attached through various types of peripheral buses, such as a variant of the Peripheral Component Interconnect (PCI) bus standard or the Universal Serial Bus (USB) standard, for example. In some embodiments, the function of I/O interface 1306 may be split into two or more separate components, such as a north bridge and a south bridge, for example. Also, in some embodiments some or all of the functionality of I/O interface 1306, such as an interface to system memory 1304, may be incorporated directly into processor 1302.

Network interface 1310 may be configured to allow data to be exchanged between computer system 1300 and other devices attached to a network 1324 (e.g., carrier or agent devices) or between nodes of computer system 1300. Network 1324 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1310 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1312 may, in some embodiments, include one or more display terminals, keyboards, keypads, touchpads, scanning devices, voice or optical recognition devices, or any other devices suitable for entering or accessing data by one or more computer systems 1300. Multiple input/output devices 1312 may be present in computer system 1300 or may be distributed on various nodes of computer system 1300. In some embodiments, similar input/output devices may be separate from computer system 1300 and may interact with one or more nodes of computer system 1300 through a wired or wireless connection, such as over network interface 1310.

Those skilled in the art will appreciate that computer system 1300 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1300 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1300 may be transmitted to computer system 1300 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g., SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A camera, comprising:
    a lens group;
    an image sensor;
    an actuator to move the image sensor relative to the lens group; and
    a flexure that suspends the image sensor from a stationary structure of the camera and that allows motion of the image sensor enabled by the actuator, the flexure comprising:
        a dynamic platform to which the image sensor is connected such that the image sensor moves with the dynamic platform,
        a static platform connected to a static portion of the camera, and
        a plurality of flexure arms that mechanically connect the dynamic platform to the static platform, wherein the plurality of flexure arms comprises:
            a first flexure arm including:
                one or more electrical traces with a first impedance, and
                a base layer having a first width, and
            a second flexure arm including:
                one or more electrical traces with a second impedance, and
                a base layer having a second width, wherein the first impedance is greater than the second impedance, wherein the first width is less than the second width, and wherein the second flexure arm routes image data from the image sensor.

2. The camera of claim 1, wherein the second flexure arm comprises at least one of:
    a signal trace having a cross-sectional area that is greater than a cross-sectional area of a signal trace of the first flexure arm; or
    a pair of signal traces separated by a distance that is greater than a distance separating a pair of signal traces of the first flexure arm.

3. The camera of claim 1, wherein the second flexure arm has a stiffness that is at least similar to the first flexure arm based on the second flexure arm having a greater length that the first flexure arm.

4. The camera of claim 1, wherein the second flexure arm has a greater stiffness than the first flexure arm, and wherein the plurality of flexure arms comprises:
    a first set of flexure arms including the first flexure arm; and
    a second set of flexure arms including the second flexure arm, wherein a combined stiffness of first set of flexure arms is at least similar to the combined stiffness of the second set of flexure arms.

5. The camera of claim 4, wherein the first set of flexure arms includes a third flexure arm including:
    one or more electrical traces having the second impedance, and
    a base layer having the second width.

6. The camera of claim 4, wherein first flexure arm is shorter than the second flexure arm.

7. The camera of claim 4, wherein the first set of flexure arms are shorter than the second set of flexure arms.

8. The camera of claim 4, wherein the flexure comprises four quadrants, wherein the plurality of flexure arms comprises:
    the first set of flexure arms in a first quadrant of the four quadrants;
    the second set of flexure arms in a second quadrant of the four quadrants and that is located in an opposite corner of the flexure from the first quadrant;
    a third set of flexure arms in a third quadrant of the four quadrants; and a fourth set of flexure arms in a fourth quadrant of the four quadrants and that is located in an opposite corner of the flexure from the third quadrant.

9. A device, comprising:
one or more processors;
memory storing program instructions executable by the one or more processors to control operation of a camera; and
the camera comprising:
a lens group;
an image sensor;
an actuator to move the image sensor relative to the lens group; and
a flexure that suspends the image sensor from a stationary structure of the camera and that allows motion of the image sensor enabled by the actuator, the flexure comprising:
a dynamic platform to which the image sensor is connected such that the image sensor moves with the dynamic platform,
a static platform connected to a static portion of the camera, and
a plurality of flexure arms that mechanically connect the dynamic platform to the static platform, wherein the plurality of flexure arms comprises:
a dynamic platform to which the image sensor is connected such that the image sensor moves with the dynamic platform,
a static platform connected to a static portion of the camera, and
a plurality of flexure arms that mechanically connect the dynamic platform to the static platform, wherein the plurality of flexure arms comprises:
a first flexure arm including:
one or more electrical traces with a first impedance, and
a base layer having a first width, and
a second flexure arm including:
one or more electrical traces with a second impedance, and
a base layer having a second width, wherein the first impedance is greater than the second impedance, wherein the first width is less than the second width, and wherein the second flexure arm routes image data from the image sensor.

10. The device of claim 9, wherein the second flexure arm comprises at least one of:
a signal trace having a cross-sectional area that is greater than a cross-sectional area of a signal trace of the first flexure arm; or
a pair of signal traces separated by a distance that is greater than a distance separating a pair of signal traces of the first flexure arm.

11. The device of claim 9, wherein the second flexure arm has a stiffness that is at least similar to the first flexure arm based on the second flexure arm having a greater length that the first flexure arm.

12. The device of claim 9, wherein the second flexure arm has a greater stiffness than the first flexure arm, and wherein the plurality of flexure arms comprises:
a first set of flexure arms including the first flexure arm; and
a second set of flexure arms including the second flexure arm, wherein a combined stiffness of first set of flexure arms is at least similar to the combined stiffness of the second set of flexure arms.

13. The device of claim 12, wherein the first set of flexure arms includes a third flexure arm having an impedance that is at least similar to the second flexure arm.

14. The device of claim 12, wherein first flexure arm is shorter than the second flexure arm.

15. The device of claim 12, wherein the first set of flexure arms are shorter than the second set of flexure arms.

16. The device of claim 12, wherein the flexure comprises four quadrants, wherein the plurality of flexure arms comprises:
the first set of flexure arms in a first quadrant of the four quadrants;
the second set of flexure arms in a second quadrant of the four quadrants and that is located in an opposite corner of the flexure from the first quadrant;
a third set of flexure arms in a third quadrant of the four quadrants; and
a fourth set of flexure arms in a fourth quadrant of the four quadrants and that is located in an opposite corner of the flexure from the third quadrant.

17. A flexure for a camera module, comprising:
a dynamic platform to which an image sensor is connected such that the image sensor moves with the dynamic platform;
a static platform connected to a static portion of the camera; and
a plurality of flexure arms that mechanically connect the dynamic platform to the static platform, wherein the plurality of flexure arms comprises:
a first flexure arm including:
one or more electrical traces with a first impedance, and
a base layer having a first width, and
a second flexure arm including:
one or more electrical traces with a second impedance, and
a base layer having a second width, wherein the first impedance is greater than the second impedance, wherein the first width is less than the second width, and wherein the second flexure arm routes image data from the image sensor.

18. The flexure of claim 17, wherein the second flexure arm comprises at least one of:
a signal trace having a cross-sectional area that is greater than a cross-sectional area of a signal trace of the first flexure arm; or
a pair of signal traces separated by a distance that is greater than a distance separating a pair of signal traces of the first flexure arm.

19. The flexure of claim 17, wherein the second flexure arm has a stiffness that is at least similar to the first flexure arm based on the second flexure arm having a greater length that the first flexure arm.

20. The flexure of claim 17, wherein the second flexure arm has a greater stiffness than the first flexure arm, and wherein the plurality of flexure arms comprises:
a first set of flexure arms including the first flexure arm; and
a second set of flexure arms including the second flexure arm, wherein a combined stiffness of first set of flexure arms is at least similar to the combined stiffness of the second set of flexure arms.

* * * * *